(12) United States Patent
Johnson et al.

(10) Patent No.: US 12,430,594 B2
(45) Date of Patent: Sep. 30, 2025

(54) DEVICE, SYSTEM AND METHOD FOR ELECTRONICALLY IMPLEMENTING CORRECTIVE ACTIONS BASED ON KEEP-SEPARATE ATTRIBUTES

(71) Applicant: MOTOROLA SOLUTIONS, INC., Chicago, IL (US)

(72) Inventors: Eric Johnson, Chicago, IL (US); Yujing Su, Chicago, IL (US); Veerapriya Veerasubramanian, Chicago, IL (US); Benjamin Zaslow, Chicago, IL (US); Catherine S. Witkin, Cambridge, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 989 days.

(21) Appl. No.: 17/512,196

(22) Filed: Oct. 27, 2021

(65) Prior Publication Data
US 2022/0051167 A1    Feb. 17, 2022

Related U.S. Application Data

(63) Continuation-in-part of application No. 16/520,520, filed on Jul. 24, 2019, now abandoned.

(51) Int. Cl.
*G06Q 10/0631* (2023.01)
*G06Q 10/1093* (2023.01)
*G06Q 50/26* (2012.01)

(52) U.S. Cl.
CPC ........ *G06Q 10/063114* (2013.01); *G06Q 10/063116* (2013.01); *G06Q 10/1097* (2013.01); *G06Q 50/26* (2013.01)

(58) Field of Classification Search
CPC ......... G06Q 10/06; G06Q 10/063114; G06Q 10/063116; G06Q 10/10; G06Q 10/1093; G06Q 10/1097; G06Q 50/26
See application file for complete search history.

(56) References Cited

U.S. PATENT DOCUMENTS 6,437,696 B1    8/2002 Lemelson et al.
7,805,457 B1    9/2010 Viola et al.
(Continued)

OTHER PUBLICATIONS

Yuan et al., A Smart Work Performance Measurement System for Police Officers, Sep. 24, 2015, IEEE Access, vol. 3, pp. 1755-1764 (Year: 2015).*

(Continued)

*Primary Examiner* — Robert D Rines
(74) *Attorney, Agent, or Firm* — PERRY + CURRIER INC. (FOR MSI)

(57) ABSTRACT

A device, system and method for electronically implementing corrective actions based on keep-separate attributes is provided. A keep-separate attribute associated with respective inmate profiles is generated using electronic data indicative of monitoring inmates. Schedule data, associated with the inmate profiles, which violates the keep-separate attribute within a given time period, is modified using the keep-separate attribute, to indicate a physical separation between the inmates. The keep-separate attribute and/or modification of the schedule data occurs via one or more machine-learning algorithms. The modified schedule data is stored and/or a notification of the modified schedule data is transmitted, to one or more communication devices, to instruct one or more correctional officers to physically separate the inmates within the given time period. A machine-learning feedback loop is implemented to process feedback indicative of an evaluation of one or more of the keep-separate attribute and the schedule data as modified.

18 Claims, 9 Drawing Sheets

(56) References Cited

U.S. PATENT DOCUMENTS

| | | | |
|---|---|---|---|
| 9,195,866 B1* | 11/2015 | Mehranfar | G06Q 10/06 |
| 11,538,125 B1* | 12/2022 | Shipman, Jr. | G06Q 50/26 |
| 2004/0213388 A1 | 10/2004 | Mow | |
| 2005/0228688 A1 | 10/2005 | Visser et al. | |
| 2008/0122613 A1 | 5/2008 | Sanger | |
| 2013/0179210 A1 | 7/2013 | Collins | |
| 2016/0042293 A1 | 2/2016 | Torgersrud | |
| 2016/0078281 A1 | 3/2016 | Gongaware et al. | |
| 2016/0191484 A1 | 6/2016 | Gongaware | |
| 2016/0210607 A1 | 7/2016 | Griffin | |
| 2016/0239932 A1 | 8/2016 | Sidler et al. | |
| 2017/0083714 A1 | 3/2017 | Keiser et al. | |
| 2017/0374554 A1 | 12/2017 | Byrne | |
| 2018/0308342 A1 | 10/2018 | Hodge | |
| 2018/0357382 A1 | 12/2018 | Hodge et al. | |
| 2019/0066247 A1 | 2/2019 | Hodge | |
| 2019/0130733 A1* | 5/2019 | Hodge | G06Q 10/0639 |
| 2020/0125838 A1* | 4/2020 | Dalley, Jr. | H04N 23/617 |
| 2020/0226705 A1* | 7/2020 | Brans | G08B 21/22 |

OTHER PUBLICATIONS

Wang, Jay-Ming, "Device, System and Method for Electronically Implementing Corrective Actions Based on Keep-Separate Attributes", U.S. Appl. No. 16/520,520, filed Jul. 24, 2019.

Austin, J., "Objective Jail Classification Systems: A Guide for Jail Administrators," US DOJ, National Institute of Corrections, Feb. 1998. pp. 1-66.

\* cited by examiner

DEVICE, SYSTEM AND METHOD FOR ELECTRONICALLY IMPLEMENTING CORRECTIVE ACTIONS BASED ON KEEP-SEPARATE ATTRIBUTES

BACKGROUND OF THE INVENTION

In jails, a safety and security challenge is to electronically ensure that inmates who should not come into contact with one another are kept separate.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
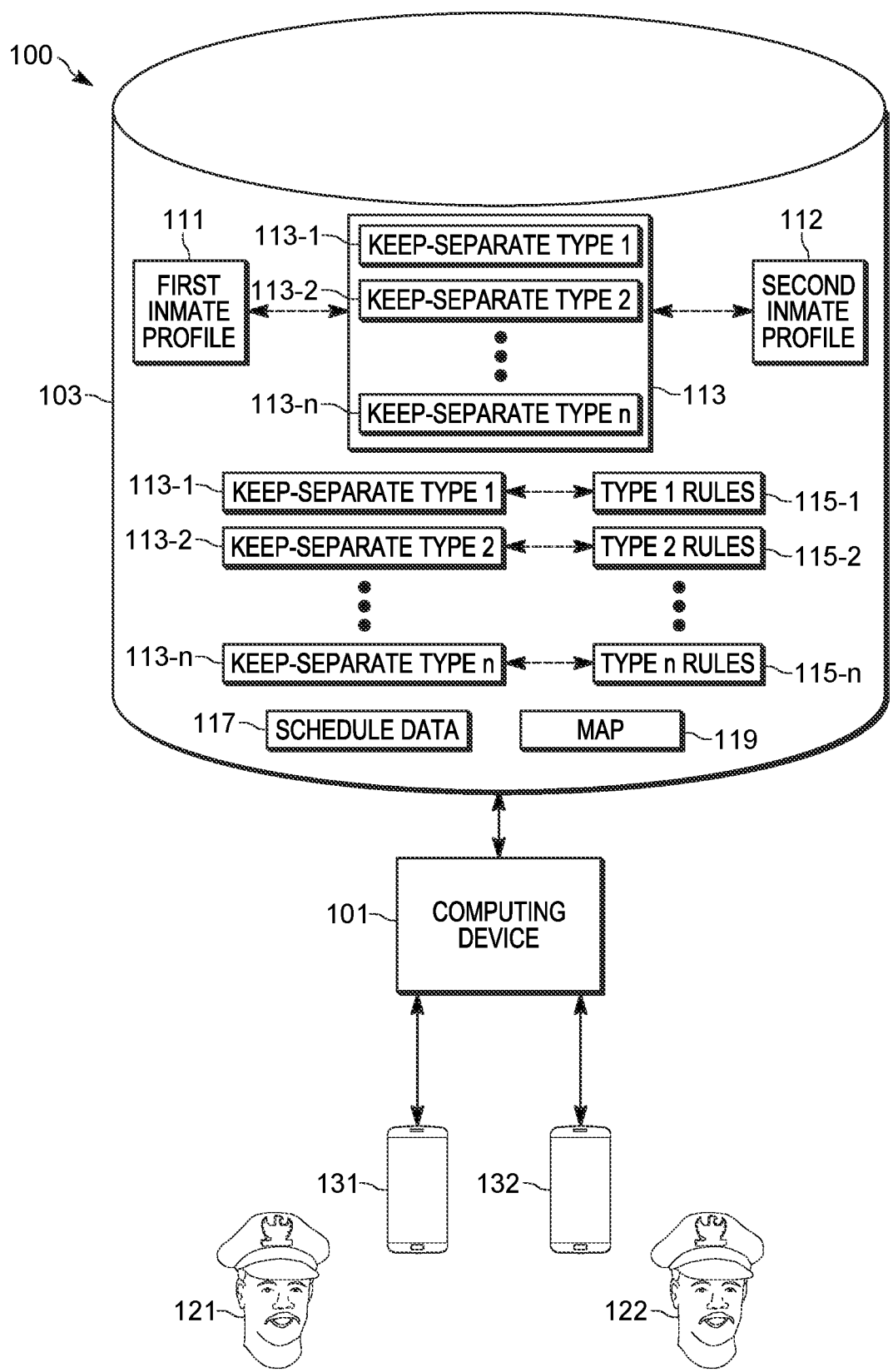
FIG. 1 is a system for electronically implementing corrective actions based on keep-separate attributes, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In jails, a safety and security challenge is to electronically ensure that inmates who should not come into contact with one another are kept separate. Inmates may, for example, be in rival gangs and/or be family members and could become violent if physically able to see each other, or inmates may have been involved in the same crime in the past and may collude (e.g., in a court case) and/or be accused of potential collusion if allowed to communicate.

A classification process, during which a correctional officer captures information that assists the prison staff in managing an inmate's schedule, pod (e.g., collection of cells) assignment, activities and associated movements in the jail, may provide information that can assist in identifying inmates that should be kept separate from each other. It is, however, difficult to comprehensively manage schedules, activities and movements that take into account all keep-separate-related inmate data while dynamically adjusting to new, spontaneous keep-separate situations. Furthermore, in some situations, inmates may be moved to separate jails to keep them separate, which is a waste of processing and transportation resources.

An aspect of the present specification provides a method comprising: identifying, at a computing device, a keep-separate attribute, associated with a first inmate profile and a second inmate profile, the keep-separate attribute violated by schedule data associated with the first inmate profile and the second inmate profile, the computing device having access to one or more memories storing the first inmate profile, the second inmate profile, the keep-separate attribute and the schedule data; and implementing, at the computing device, a corrective action in accordance with the keep-separate attribute, the corrective action comprising one or more of: modifying, at the one or more memories, the schedule data in accordance with the keep-separate attribute; and transmitting, using a communication unit, a notification of the keep-separate attribute to one or more communication devices associated with implementing the schedule data.

An aspect of the present specification provides a device comprising: a controller in communication with a communication unit and having access to one or more memories storing a first inmate profile, a second inmate profile, keep-separate attributes and schedule data, the controller configured to: identify a keep-separate attribute associated with the first inmate profile and the second inmate profile, the keep-separate attribute violated by the schedule data associated with the first inmate profile and the second inmate profile; and implement a corrective action in accordance with the keep-separate attribute, the corrective action comprising one or more of: modifying, at the one or more memories, the schedule data in accordance with the keep-separate attribute; and transmitting, using the communication unit, a notification of the keep-separate attribute to one or more communication devices associated with implementing the schedule data.

Another aspect of the present specification provides a method comprising: receiving, at a device, electronic data indicative of monitoring inmates associated with respective inmate profiles; generating, at the device, using the electronic data, a keep-separate attribute associated with the respective inmate profiles; determining, at the device, that schedule data associated with the respective inmate profiles violates the keep-separate attribute within a given time period; modifying, at the device, using the keep-separate attribute, the schedule data to indicate a physical separation between the inmates within the given time period, wherein one or more of the keep-separate attribute and modification of the schedule data are implemented via one or more machine-learning algorithms; one or more of: storing, at a memory, the schedule data as modified; and transmitting, using a communication unit, a notification of the schedule data as modified, to one or more communication devices to instruct one or more correctional officers to physically separate the inmates within the given time period; and implementing, at the device, a machine-learning feedback loop for training the one or more machine-learning algorithms, the machine-learning feedback loop comprising processing feedback indicative of an evaluation of one or more of the keep-separate attribute and the schedule data as modified.

Yet a further aspect of the present specification provides a device comprising: a communication unit; and a controller configured to: receive, using the communication unit, electronic data indicative of monitoring inmates associated with respective inmate profiles; generate, using the electronic data, a keep-separate attribute associated with the respective inmate profiles; determine that schedule data associated with the respective inmate profiles violates the keep-separate attribute within a given time period; modify, using the keep-separate attribute, the schedule data to indicate a physical separation between the inmates within the given time period, wherein one or more of the keep-separate attribute and modification of the schedule data are implemented via one or more machine-learning algorithms; one or more of: storing, at a memory, the schedule data as modified; and transmitting, using the communication unit, a notification of the schedule data as modified, to one or more communication devices to instruct one or more correctional officers to physically separate the inmates within the given time period; and implement a machine-learning feedback loop for training the one or more machine-learning algorithms, the machine-learning feedback loop comprising processing feedback indicative of an evaluation of one or more of the keep-separate attribute and the schedule data as modified.

Attention is directed to FIG. 1, which depicts an example system 100 for electronically implementing corrective actions based on keep-separate attributes. Communication links between components of the system 100 are depicted in FIG. 1, and throughout the present specification, as double-ended arrows between respective components; the communication links may include any suitable combination of wireless and/or wired links and/or wireless and/or wired communication networks. The system 100 comprises a computing device 101 (interchangeably referred to hereafter as the device 101) that has access to inmate data, for example as stored in a database 103. As depicted, the inmate data comprises a first inmate profile 111 and a second inmate profile 112. For example, the computing device 101 and the database 103 may be operated by a prison and/or a jail (the terms prison and jail will be used interchangeably hereafter), and each of the inmate profiles 111, 112 are associated with a respective inmate at the prison.

While a particular database structure is depicted in FIG. 1, the components of the database 103 may be stored according to any suitable structure and/or in any suitable manner including, but not limited to, storing the information in one or more databases and/or one or more memories (e.g., that may or may not include databases and/or a database structure). Hence, for example, the database 103 is understood to be stored at one or more memories and/or the database 103 may be replaced by one or more memories.

Furthermore, while components of the database 103 are described herein as being "profiles" etc., the term "profiles" (and/or other terms used to described components of the database 103), is not intended to identify a particular type of storage format and such information may include any suitable format for storing information in a database and/or a memory, and the like.

While only two inmate profiles 111, 112 are depicted, the database 103 may store hundreds, thousands and/or more inmate profiles, corresponding to an inmate at the prison, and the number of inmate profiles stored in the database 103 may correspond to a number of inmates at the prison, though the database 103 may also store historical inmate profiles (e.g., for inmates no longer at the prison). Hence, while present examples are described with respect to two inmate profiles 111, 112, methods and systems described herein may be applied to more than two inmate profiles.

The inmate profiles 111, 112 may be initially generated as part of a classification process, for example implemented when the associated inmates are initially incarcerated. In particular, the inmate profiles 111, 112 may be generated as part of an objective jail classification (OJC) process to assess the associated inmate's custody and program needs. The inmate profiles 111, 112 may, for example, include identification of one or more of crimes committed by the associated inmates, family members, gang affiliations, court dates, and the like.

However, the inmate profiles 111, 112 may be updated during the incarceration of the associated inmates, for example via monitoring and/or ongoing monitoring and/or electronic monitoring and/or ongoing electronic monitoring of the associated inmates and/or behavior of the associated inmates (e.g., as monitored via video cameras and/or microphones and/or based on electronic reports indicating inmate behavior, for example as electronically submitted to the device 101 by one or more correctional officers, and the like, at the prison). In some examples, machine learning-based algorithms (e.g., as implemented by the computing device 101, described below), and the like, may be used to update the inmate profiles 111, 112. Such updating of the inmate profiles 111, 112 may occur when the associated inmates exhibit given behaviors including, but not limited to, one or more of fighting, breaking prison rules, transactions (e.g., buying or selling contraband within the prison), smuggling (e.g., contraband drugs, weapons, phones, and the like), forming and/or participating in a criminal enterprise within the prison, and the like. While such behaviors are associated with escalating risk between the associated inmates, updating of the inmate profiles 111, 112 may occur when the associated inmates exhibit given behaviors that are associated with de-escalating risk between the associated inmates, for example the associated inmates becoming friends, joining a support group, negotiating a truce, and the like.

From the inmate profiles 111, 112, one or more keep-separate attributes 113 may be identified and associated with the inmate profiles 111, 112. Associations between components stored at the database 103 are depicted in FIG. 1, and throughout the present specification, as double-ended dashed arrows therebetween.

While a number "n" of keep-separate attributes 113-1, 113-2 . . . 113-n are depicted (e.g., n=3), the number of keep-separate attributes 113 may be as few as one keep-separate attribute, and "n" may be any suitable number for the keep-separate attributes 113, which may depend, for example, on a number of identified relationships, and the like, between the inmate profiles 111, 112.

For example, a separate keep-separate attribute 113 may be generated for different relationships between associated inmates as defined by, and/or determined from, the inmate profiles 111, 112. Such relationships defined by, and/or determined from, the inmate profiles 111, 112 may include, but are not limited to: the associated inmates being in a same gang; the associated inmates being in rival gangs; the associated inmates being family members; the associated inmates participating in a same court case; the associated inmates participating in related court cases; the associated inmates having a same court date (e.g., to testify); the associated inmates were dealing in drugs, and/or contraband, in the prison; the associated inmates were in a fight; and the like.

For example, as depicted, each of the keep-separate attributes 113 is of a different type (e.g., the keep-separate attribute 113-1 is a "Type 1" keep-separate attribute, the keep-separate attribute 113-2 is a "Type 2" keep-separate attribute, the keep-separate attribute 113-n is a "Type n" keep-separate attribute), and each of the different types of keep-separate attribute 113 may define different relationships between the inmates associated with the inmate profiles 111, 112. For example, "Type 1" may be family relationship, "Type 2" may be a gang relationship, etc.

As depicted, each of the keep-separate attributes 113 may be associated with a respective keep-separate rule; for example, as depicted, each of the keep-separate attributes 113-1, 113-2 . . . 113-n are associated, at the database with respective keep-separate rules 115-1, 115-2 . . . 115-n. The keep-separate rules 115-1, 115-2 . . . 115-n are interchangeably referred to hereafter, collectively, as the rules 115 and, generically, as a rule 115.

While the keep-separate attributes 113 and rules 115 are depicted in a one-to-one relationship with each other, each keep-separate attribute 113 may be associated with more than one rule 115. For example, as depicted, each of the rules 115 is of a different type (e.g., the rule 115-1 is a "Type 1" keep-separate rule, the rule 115-2 is a "Type 2" keep-separate rule, the rule 115-n is a "Type n" keep-separate rule), however each keep-separate attribute 113 may be associated with more than one rule 115 and/or keep-separate rule type. For example, a "Type 1" rule may be a spatial rule, a "Type 2" rule may be a temporal rule, etc.

A rule 115 may include a rule that is to be implemented to keep the inmates associated with the inmate profiles 111, 112 separated from each other. For example, the rules 115 may include, but are not limited to, rules for keeping the inmates associated with the inmate profiles 111, 112 spatially separated such that the associated inmates are not in a same location at any given time. Similarly, the rules 115 may include, but are not limited to, rules for keeping the inmates associated with the inmate profiles 111, 112 temporally separated such that the associated inmates are not to in a same location at any given time and/or within given time periods of each other. Similarly, the rules 115 may include, but are not limited to, rules for keeping the inmates associated with the inmate profiles 111, 112 from being able to see each other, for example through windows and/the like, for example by keeping the inmates spatially and/or temporally separated. Other keep separate rules 115 may include, but are not limited to, allowing the associated inmates to see each other but unable to have a conversation and/or talk (e.g., as defined by a given distance), allowing the associated inmates to talk but physically separated. Indeed, any suitable keep-separate rule 115 is within the scope of the present specification, including, but not limited to, given distances to be kept between inmates are to be kept apart and/or given time periods that inmates are not to be in a same location (e.g., a rule 115 may include specifying that a first inmate is never to be within 10 minutes transport time of second inmate). Furthermore, different rule types may specify different given distances and/or different given time periods by which inmates are to be kept separate. Other keep-separate rule 115 may be related to inmates hearing each other, communicating via tapping (e.g., via Morse code and the like), and/or any other suitable type of communication.

Furthermore, while not depicted, the rules 115 may be ranked according to "stringency"; for example, the rules 115 may be assigned a respective stringency score (e.g., using any suitable scale, such as 1 to 10, and the like, with 1 being most stringent and 10 being least stringent). The rules 115 may be ranked for stringency manually and/or automatically. For example, a first rule 115 may be more stringent than a second rule 115 when the first rule 115 indicates that inmates are to be kept a further distance apart than the second rule 115.

While the rules 115 are depicted in FIG. 1 as being associated with, but separate from, the keep-separate attributes 113, in other examples, one or more of the rules 115 may be incorporated into a respective keep-separate attribute 113. As such, while as described herein the rules 115 may be ranked according to stringency, in other examples, the keep-separate attributes 113 may be ranked according to stringency As depicted, the database 103 further stores schedule data 117 and a map 119 of the prison. The schedule data 117 may be associated with the inmate profiles 111, 112. While one set of schedule data 117 is depicted, in other examples, the schedule data 117 may include a separate set of schedule data 117 for each of the inmate profiles 111, 112.

Furthermore, the schedule data 117 may be updated periodically, for example as schedules of the inmates associated with the inmate profiles 111, 112 change and/or are updated and/or are generated.

The schedule data 117 may indicate schedules of the inmates associated with the inmate profiles 111, 112, for example given locations, and the like (e.g., such as cells, classrooms, cafeterias, gyms, recreation rooms, etc.), given activities (e.g., classes, eating meals, gym time, recreational time), to which the inmates are to be escorted to and/or located at given times and/or for given time periods, as well as routes and/or movements for transporting the inmates between locations, and/or start locations and/or end locations of routes and/or movements. Indeed, hereafter the term movement will be used, and it is understood that a movement may include, but is not limited to, a route.

Such given locations and/or given times and/or given movements may violate a keep-separate attribute 113 and/or an associated rule 115. Violating a keep-separate attribute 113 as described herein may include, but is not limited to, violating a rule 115 associated with a keep-separate attribute 113 and/or violating a rule 115 incorporated into a keep-separate attribute 113.

The map 119 of the prison is understood to comprise an electronic map of the prison where the inmates associated with the inmate profiles 111, 112 are located and may include identifiers of the various locations of the schedule data 117. While as depicted the map 119 is separate from the schedule data 117, in other examples, the map 119 may be incorporated into the schedule data 117. Regardless, the movements for transporting the inmates between locations may be determined via the map 119

In general, the inmates associated with the inmate profiles 111, 112 may be escorted around the prison according to the schedule data 117 by one or more correctional officers 121, 122 enforcing the schedule data 117. For example, the officer 121 may be tasked with transporting and/or escorting the inmate associated with the inmate profile 111 (e.g., according to the schedule data 117), and the officer 122 may be tasked with transporting and/or escorting the inmate associated with the inmate profile 112 (e.g., according to the schedule data 117). As depicted, each of the officers 121, 121 is associated with a respective communication device 131, 132.

As depicted, the device 101 is in communication with communication device 131, 132 via respective communication links. While the communication devices communication device 131, 132 are depicted as, for example, mobile communication devices (e.g., such as a mobile radio and/or a cellphone and the like), one or more of the communication devices 131, 132 may comprise a vehicle communication device (e.g., of a vehicle used to transport and/or escort inmates around the prison, the vehicle operated by an officer 121, 122), and/or), one or more of the communication devices 131, 132 may comprise a fixed position communication device, such as personal computer at an officer's station, and the like.

While only two correctional officers 121, 122 and two communication devices 131, 132 are depicted, the system 100 may comprise any suitable number of correctional officers operating respective communicating devices.

Furthermore, the device 101 may generally communicate with the communication devices 131, 132 to cause the officers 121, 122 to implement the schedule data 117; hence the communication devices 131, 132 may be referred to as being associated with implementing the schedule data 117.

Figure 2:
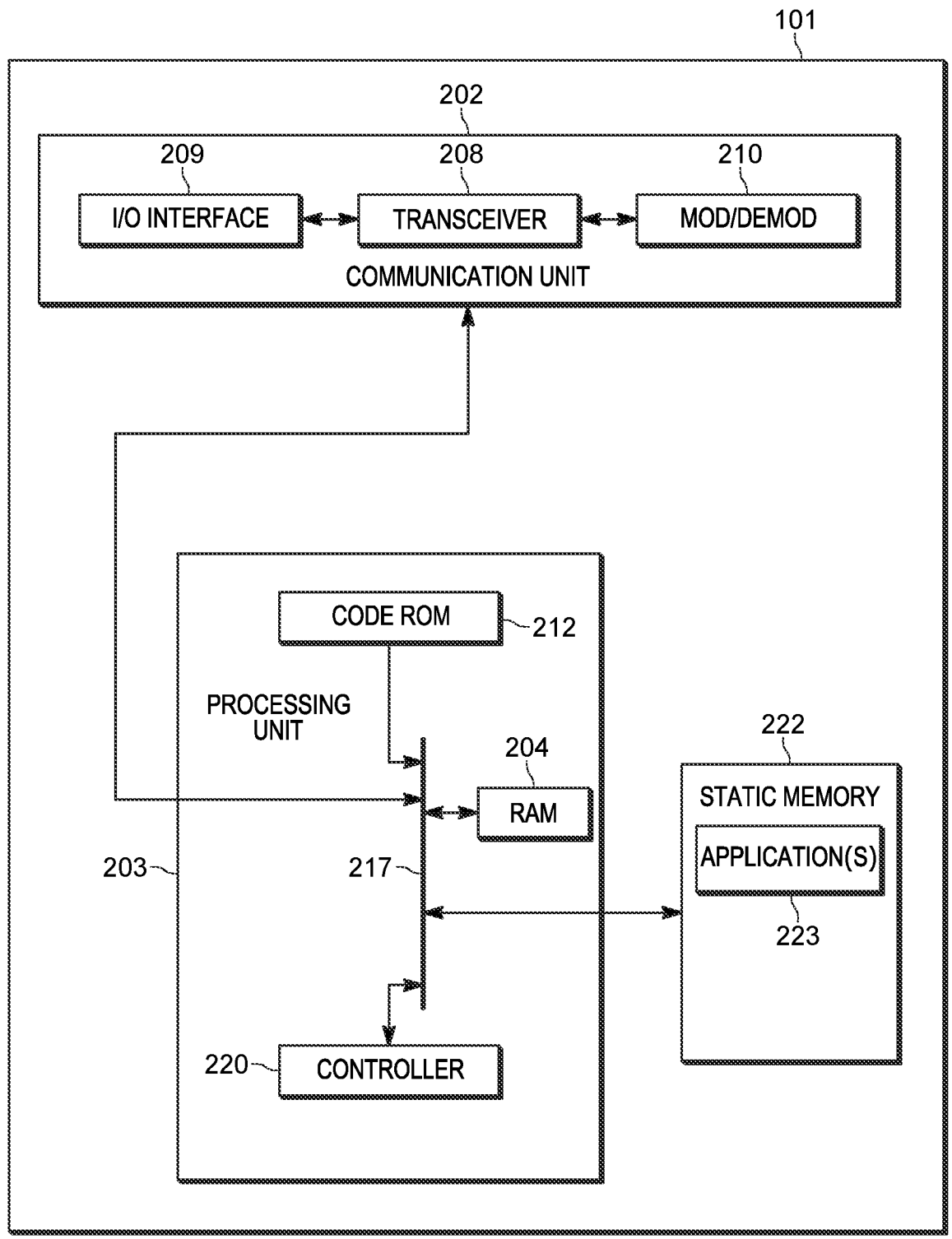
FIG. 2 is a device diagram showing a device structure of a device for electronically implementing corrective actions based on keep-separate attributes, in accordance with some examples.

Attention is next directed to FIG. 2, which depicts a schematic block diagram of an example of the device 101. In general, the device 101 may comprise one or more servers and/or one or more cloud computing devices, and the like, configured to communicate the communication devices 131, 132. However, the device 101 may comprise a computing device such as a personal computer and/or a laptop computer, and the like. In some examples, the device 101 may be combined with one or more of the communication devices 131, 132. The device 101 may be located at the prison and/or located remotely from the prison.

As depicted, the device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the device 101 may include one or more of an input device and a display screen and the like, a microphone (e.g., to receive voice commands) such that a user may interact with the device 101.

As shown in FIG. 2, the device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the communication devices 131, 132. For example, the communication unit 202 may include one or more transceivers 208 and/or wireless transceivers for communicating with the communication devices 131, 132. Hence, the one or more transceivers 208 may be adapted for communication with one or more communication networks used to communicate with the communication devices 131, 132. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g., hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for electronically implementing corrective actions based on keep-separate attributes. For example, in some examples, the device 101 and/or the controller 220 specifically comprises a computer executable engine configured to implement functionality for electronically implementing corrective actions based on keep-separate attributes.

The static memory 222 is a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the device 101 as described herein are maintained, persistently, at the memory 222 and used by the controller 220, which makes appropriate utilization of volatile storage during the execution of such programming instructions.

Figure 3:
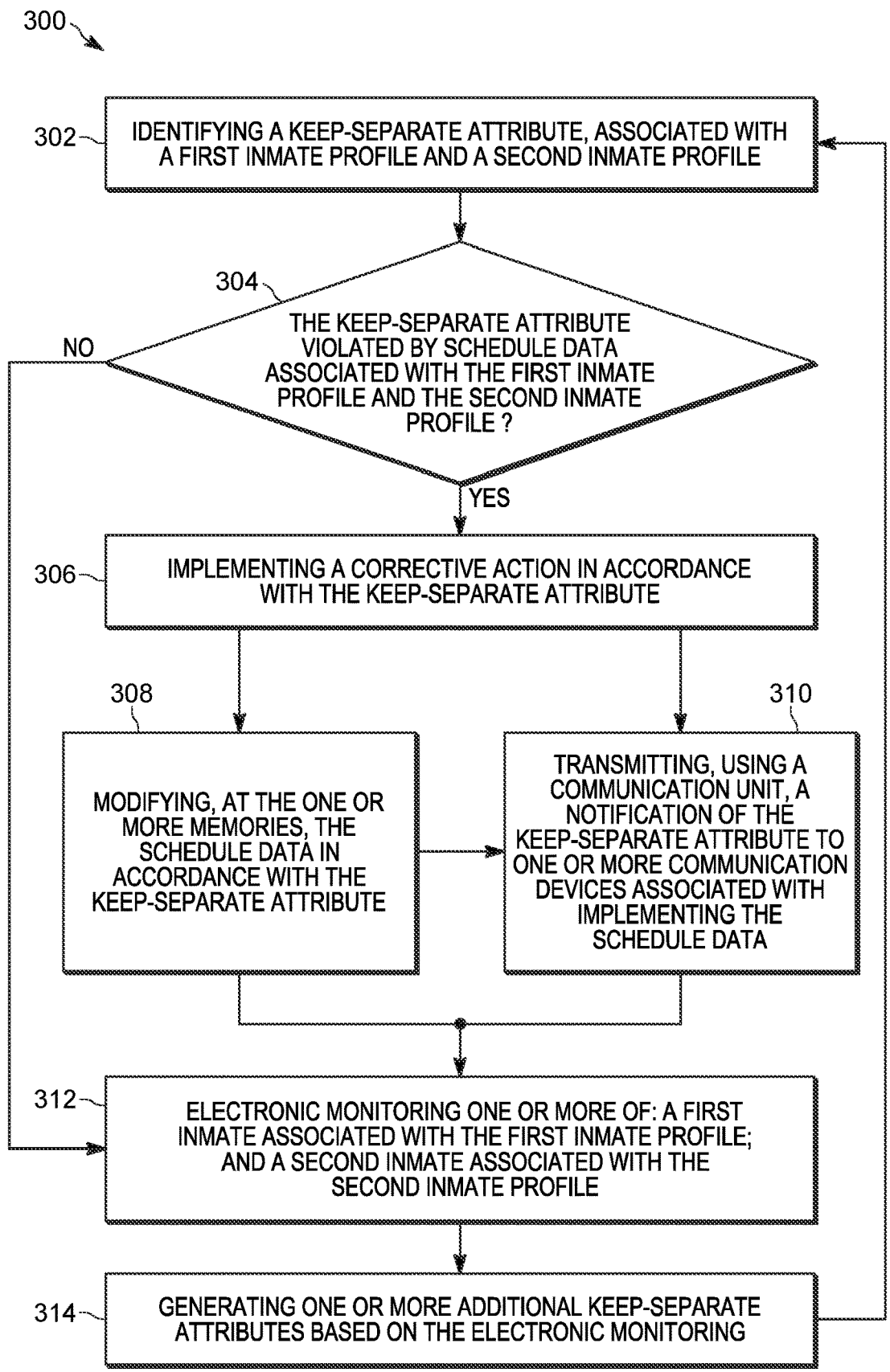
FIG. 3 is a flowchart of a method for electronically implementing corrective actions based on keep-separate attributes, in accordance with some examples.

In particular, the memory 222 stores instructions corresponding to the at least one application 223 that, when executed by the controller 220, enables the controller 220 to implement functionality for electronically implementing corrective actions based on keep-separate attributes including, but not limited to, the blocks of the method set forth in FIG. 3. In illustrated examples, when the controller 220 executes the one or more applications 223, the controller 220 is enabled to: identify a keep-separate attribute 113, associated with a first inmate profile 111 and a second inmate profile 112, the keep-separate attribute 113 violated by schedule data 117 associated with the first inmate profile 111 and the second inmate profile 112, the controller 220 (and/or the device 101) having access to one or more memories (e.g., the database 103) storing the first inmate profile 111, the second inmate profile 112, the keep-separate attribute 113 and the schedule data 117; and implement a corrective action in accordance with the keep-separate attribute 113, the corrective action comprising one or more of: modifying, at the one or more memories, the schedule data 117 in accordance with the keep-separate attribute 113; and transmitting, using the communication unit 202, a notification of the keep-separate attribute 113 to one or more communication devices 131, 132 associated with implementing the schedule data 117.

The application 223 may include numerical algorithms to compare the inmate profiles 111, 112 to identify and/or generate the keep-separate attributes 113 and/or to update the inmate profiles 111, 112 to according to monitored behavior of the inmates associated with the inmate profiles 111, 112 (e.g., as monitored via video cameras and/or microphones and/or based on electronic reports indicating inmate behavior, for example as electronically submitted to the device 101 by one or more of the officers 121, 122, and/or another correctional officer, and the like, at the prison).

Alternatively, the application 223 may include machine learning and/or deep-learning based algorithms and/or neural networks, and the like, which have been trained to determine keep-separate attributes by comparing inmate profiles, and/or which have been trained to update inmate profiles based on monitored behavior. Furthermore, in these examples, the application 223 may initially be operated by the controller 220 in a training mode to train the machine learning and/or deep-learning based algorithms and/or neural networks of the application 223 to determine keep-separate attributes by comparing inmate profiles, and/or which have been trained to update inmate profiles based on monitored behavior.

The one or more machine-learning algorithms and/or deep learning algorithms and/or neural networks of the application 223 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments, such as a prison. Any suitable machine-learning algorithm and/or deep learning algorithm and/or neural network is within the scope of present examples.

While details of the communication devices 131, 132 are not depicted, the communication devices 131, 132 may have components similar to the device 101 adapted, however, for the functionality of the communication devices 131, 132. For example, the communication devices 131, 132 may include respective display screens, speakers, microphones, location determining devices (e.g., Global Positioning System (GPS) devices), and the like.

Attention is now directed to FIG. 3, which depicts a flowchart representative of a method 300 for electronically implementing corrective actions based on keep-separate attributes. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 101 identifies a keep-separate attribute 113, associated with the first inmate profile 111 and the second inmate profile 112. The keep-separate attribute 113 may be determined dynamically; for example, the controller 220 and/or device 101 may compare the first inmate profile 111 and the second inmate profile 112 to one or more of: generate a keep-separate attribute 113; and identify a keep-separate attribute 113.

For example, in some examples, a set of preconfigured keep-separate attributes 113 (e.g., associated with pre-configured rules 115) may be stored at the database 103. The controller 220 and/or the device 101 may compare the inmate profiles 111, 112 to determine a type of relationship therebetween. The set of preconfigured keep-separate attributes 113 may include a preconfigured keep-separate attribute 113 associated with the type of relationship identified between the inmate profiles 111, 112 and the controller 220 and/or the device 101 may then associate the preconfigured keep-separate attribute 113 with the inmate profiles 111, 112.

In some of these examples, a machine-learning algorithm, and the like, may be used by the controller 220 and/or the device 101 to compare the inmate profiles 111, 112 and generate a keep-separate attribute 113 based on the comparing, which is associated with the inmate profiles 111, 112. Alternatively, a keep-separate attribute 113 may already be associated with the inmate profiles 111, 112 (for example as depicted in FIG. 1) and, at the block 302, the controller 220 and/or the device 101 may identify the pre-existing keep-separate attribute 113, associated with the first inmate profile 111 and the second inmate profile 112.

In some examples, the block 302 may include the controller 220 and/or the device 101 identifying one or more keep-separate rules 115 associated with the keep-separate attribute 113 identified at the block 302, for example, by looking up one or more keep-separate rules 115 associated with the keep-separate attribute 113 as stored at the database 103 and/or one or more memories. However, in other examples where rules 115 are incorporated into keep-separate attributes 113, identifying a keep-separate attribute 113 may include identifying an associated rule 115.

At a block 304, the controller 220 and/or the device 101 determines whether the keep-separate attribute 113 identified at the block 302 is violated by the schedule data 117 associated with the first inmate profile 111 and the second inmate profile 112.

For example, as described above, the controller 220 and/or the device 101 has access to one or more memories (e.g., the database 103) storing the first inmate profile 111, the second inmate profile 112, the keep-separate attribute 113 and the schedule data 117. As such, the controller 220 and/or the device 101 may retrieve the keep-separate attribute 113 (e.g., and an associated rule 115) and the schedule data 117 and compare them to determine whether the inmates associated with the inmate profiles 111, 112 are to be located in a same location at a same time according to the schedule data 117. When the inmates associated with the inmate profiles 111, 112 are to be located in a same location at a same time according to the schedule data 117, and the keep-separate attribute 113 (e.g., and/or the associated rule 115) indicate that the inmates associated with the inmate profiles 111, 112 are not to be located in a same location at a same time, the controller 220 and/or the device 101 may determine that the keep-separate attribute 113 (e.g., and/or an associated rule 115) is violated, and a "YES" decision occurs at the block 304.

However, the controller 220 and/or the device 101 may determine that the keep-separate attribute 113 (e.g., and/or an associated rule 115) is not violated (e.g., a "NO" decision occurs at the block 304), and the controller 220 and/or the device 101 may optionally electronically monitor the inmates to optionally generate one or more additional keep-separate attributes, as described below, and/or continue to identify, at the block 302, a keep-separate attribute 113, which may occur as the schedule data 117 is updated, as described above.

When the controller 220 and/or the device 101 determines that the keep-separate attribute 113 (e.g., and/or an associated rule 115) is violated (e.g., a "YES" decision occurs at the block 304), at a block 306, the controller 220 and/or the device 101 implements a corrective action in accordance with the keep-separate attribute 113.

For example, the corrective action may comprise one or more of: modifying, at a block 308, at the one or more memories (e.g., at the database 103), the schedule data 117 in accordance with the keep-separate attribute 113; and transmitting, at a block 310, using the communication unit 202, a notification of the keep-separate attribute 113 to one or more communication devices 131, 132 associated with implementing the schedule data 117.

The block 308 is first described hereafter.

As described above, in some examples, the method 300 may include the controller 220 and/or the device 101 identifying (e.g., at the block 302 and/or another block) one or more keep-separate rules 115 associated with the keep-separate attribute 113. In these examples, modifying the schedule data 117 at the block 308 may include updating the schedule data 117, at the one or more memories (e.g., the database 103), according to the one or more keep-separate rules 115. For example, an associated rule 115 may indicate that inmates are to be kept a given distance apart, and/or that the inmates are not to be in a same location within a given time period of each other. Hence, when the schedule data 117 indicates that the inmates associated with the inmate profiles 111, 112 are to be in a same location and/or in a same location within a given time period, the schedule data 117 may be modified, at the block 308, such that the inmates associated with the inmate profiles 111, 112 are not in a same location and/or not in a same location within a given time period.

Hence, for example, modifying the schedule data 117 in accordance with the keep-separate attribute 113 identified at the block 302 may comprise: modifying, at the one or more memories (e.g., the database 103), one or more respective movements of the schedule data 117, the one or more respective movements associated with the first inmate profile 111 and the second inmate profile 112. Hence, for example, when movements by which the inmates are to be transported overlap (e.g., within a given time period), one or more of the movements may be changed such that the movements do not overlap. Such movement modification may include, but is not limited to, changing and/or setting a start time for a movement and/or changing the movement. In some examples, modifying respective movements of the schedule data 117 may include, but is not limited to, modifying one or more of a start location and an end location of a movement (e.g., to move an activity location, and the like).

In other examples, modifying the schedule data 117 in accordance with the keep-separate attribute 113 identified at the block 302 may comprise: modifying, at the one or more memories (e.g., the database 103), one or more respective activity times of the schedule data 117, the one or more respective activity times associated with the first inmate profile 111 and the second inmate profile 112. Hence, for example, when activities of the inmates are in overlapping time periods and/or within a given time period of each other (e.g., the inmates are to be at a cafeteria within a given time period of each other), the activity times may be changed such that the activities of the inmates are not in overlapping time periods and/or the activities are separated by a given time period. Alternatively, one or more activities of the schedule data 117, associated with the first inmate profile 111 and the second inmate profile 112, may be changed and/or rescheduled and/or cancelled.

Hence, in general, modifying the schedule data 117 in accordance with the keep-separate attribute 113 identified at the block 302 may comprise: modifying, at the one or more memories (e.g., the database 103), the schedule data 117 according to one or more spatio-temporal constraints including, but not limited to, the aforementioned changing movements, changing activity times, moving activities, changing activities, rescheduling activities, cancelling activities, and the like, though any suitable spatio-temporal constraints are within the scope of the present specification.

In some of these examples, the one or more spatio-temporal constraints may include one or more spatio-temporal buffers. For example, when a rule 115 specifies that a given distance is to be used to keep inmates separate, a buffer may be added to the given distance such as 10% (and/or any other suitable percentage) of the given distance and/or a given buffer distance. Similarly, when a rule 115 specifies that a given time period is to be used to keep inmates separate, a buffer may be added to the given time period such as 10% (and/or any other suitable percentage) of the given distance and/or a given buffer time. Such spatio-temporal buffers may be used as a safety precaution. Furthermore, more than one type of buffer (e.g., distance and time) may be applied. In addition, the given time period and/or a given buffer time may be based on monitoring of the inmates to determine, for example, historical tardiness of an inmate; for example, when a given inmate is historically 3 minutes late for an activity, a given time period of a rule 115 for keeping inmates separate may be modified accordingly and/or a given buffer time may be modified accordingly.

The block 310 is next described hereafter.

In some examples, the block 310 may include transmitting the schedule data 117, as modified at the block 310, to the communication devices 131, 132. Hence, the officers 121, 122 may read and/or be informed of the schedule data 117, as modified, and escort the inmates associated with the inmate profiles 111, 112 according to the schedule data 117, as modified. Hence, in these examples, both the blocks 308, 310 may be implemented and/or the block 308 may include transmitting the schedule data 117 to the communication devices 131, 132.

However, in other example, the officers 121, 122 may have been provided with paper versions of the schedule data 117, which may not be modified electronically. In these examples, the controller 220 and/or the device 101, at the block 310 may transmit a notification of the keep-separate attribute 113 (and/or an associated rule 115) to the one or more communication devices 131, 132 associated with implementing the schedule data 117. For example, the controller 220 and/or the device 101, at the block 310 may generate a notification to indicate applying one or more spatio-temporal constraints (e.g., as described above) to the schedule data 117; and transmit, using the communication unit 202, the notification to the one or more communication devices 131, 132, the one or more communication devices 131, 132 associated with one or more correctional officers 121, 122 enforcing the schedule data 117. In these examples, the officers 121, 122 may receive the notification via a respective communication device 131, 132 and implement the schedule data 117 indicated on paper, and the like, but according to the notification. The notification may be rendered at a display screen of a communication device 131, 132 and/or provided aurally via a speaker of a communication device 131, 132 and/or provided using any suitable notification device at a communication device 131, 132.

Alternatively, the schedule data 117 may have been transmitted to the communication devices 131, 132 prior to modification, and the notification may cause the schedule data 117, as stored at the communication devices 131, 132, to be modified and/or be provided with the schedule data 117.

Alternatively, the notification may be transmitted regardless of whether the schedule data 117 is modified (e.g., at either the database 103 and/or as stored at a communication device 131, 132) to proactively inform the officers 121, 122 of the modification, for example within the schedule data 117 already stored at the communication devices 131, 132 and/or as an alert provided by a notification device at the communication devices 131, 132 (e.g., a display screen, a speaker and the like).

In these examples, the block 308 may not be implemented as the schedule data 117 may not be modified; rather, a notification of the keep-separate attribute 113 (and/or an associated rule 115) may be transmitted to the one or more communication devices 131, 132 and provided to one or more of the officers 121, 122 by a notification device at the communication devices 131, 132

While the examples described with respect to the blocks 302, 304, 306, 308, and 310 are to one keep-separate attribute 113, in other examples the method 300 may include: identifying, at the controller 220 and/or the device 101, a plurality of keep-separate attributes 113 (e.g., as depicted in FIG. 1) associated with the first inmate profile 111 and the second inmate profile 112 as being violated by the schedule data 117, (e.g., the plurality of keep-separate attributes 113 including the keep-separate attribute 113 described with respect to the block 302), each of the plurality of keep-separate attributes associated with respective keep-separate rules 115(e.g., as depicted in FIG. 1); and identifying one or more most-stringent keep-separate rules 115 of the respective keep-separate rules 115. In some examples, at the block 310, the controller 220 and/or the device 101 modifying the schedule data 117 may comprise the controller 220 and/or the device 101 updating the schedule data 117, at the one or more memories (e.g., the database 103), according to the one or more most-stringent keep-separate rules 115. Hence, for example, when the inmate profiles 111, 112 are associated with two rules 115, a first rule 115 that is more stringent than a second rule 115 (e.g., the first rule 115 specifying a larger given distance that inmates are to be kept apart than a given distance specified by the second rule 115), then the schedule data 117 is updated according to the first, more stringent, rule 115. Furthermore, more than one most-stringent keep-separate rules 115 may be selected, for example a most stringent spatial keep-separate rule 115 and a most stringent temporal keep-separate rule 115.

In some examples, as depicted, the method 300 may optionally include a block 312, at which the controller 220 and/or the device 101 may electronically monitor one or more of: a first inmate associated with the first inmate profile 111; and a second inmate associated with the second inmate profile 112. Such electronic monitoring may occur after the blocks 308, 310 and/or in response to a "NO" decision at the block 304, and/or such electronic monitoring may be implemented on an on-going basis in conjunction with the blocks 302, 304, 306, 308, and 310 of the method 300. Such electronic monitoring may include monitoring the inmates at the prison via video cameras and/or microphones, and/or such electronic monitoring may be based on electronic reports indicating inmate behavior, for example as electronically submitted to the device 101 by one or more correctional officers, and the like, at the prison. Such monitoring may also be used to determine, for example, a given time period of a rule 115 for keeping inmates separate and/or a given buffer time and/or a given distance of a rule 115 for keeping inmates separate; indeed, the monitoring may be used to update the rules 115.

At an optional block 314, which may be implemented when the electronic monitoring at the block 312 occurs, the controller 220 and/or the device 101 may generate one or more additional keep-separate attributes 113 based on the electronic monitoring at the block 312. For example, the electronic monitoring may indicate that the inmates associated with the inmate profiles 111, 112 got into a fight, and their relationships may be updated at the inmate profiles 111, 112, which may cause an additional keep-separate attribute 113 to be generated and/or stored in association with the inmate profiles 111, 112.

Regardless, the method 300 generally repeats to continuously and/or periodically monitor the schedule data 117 (e.g., which may be dynamically updated when a schedule of an inmate changes and/or is added to, etc.), and modify the schedule data 117 when a keep-separate attribute 113 is violated.

Figure 4:
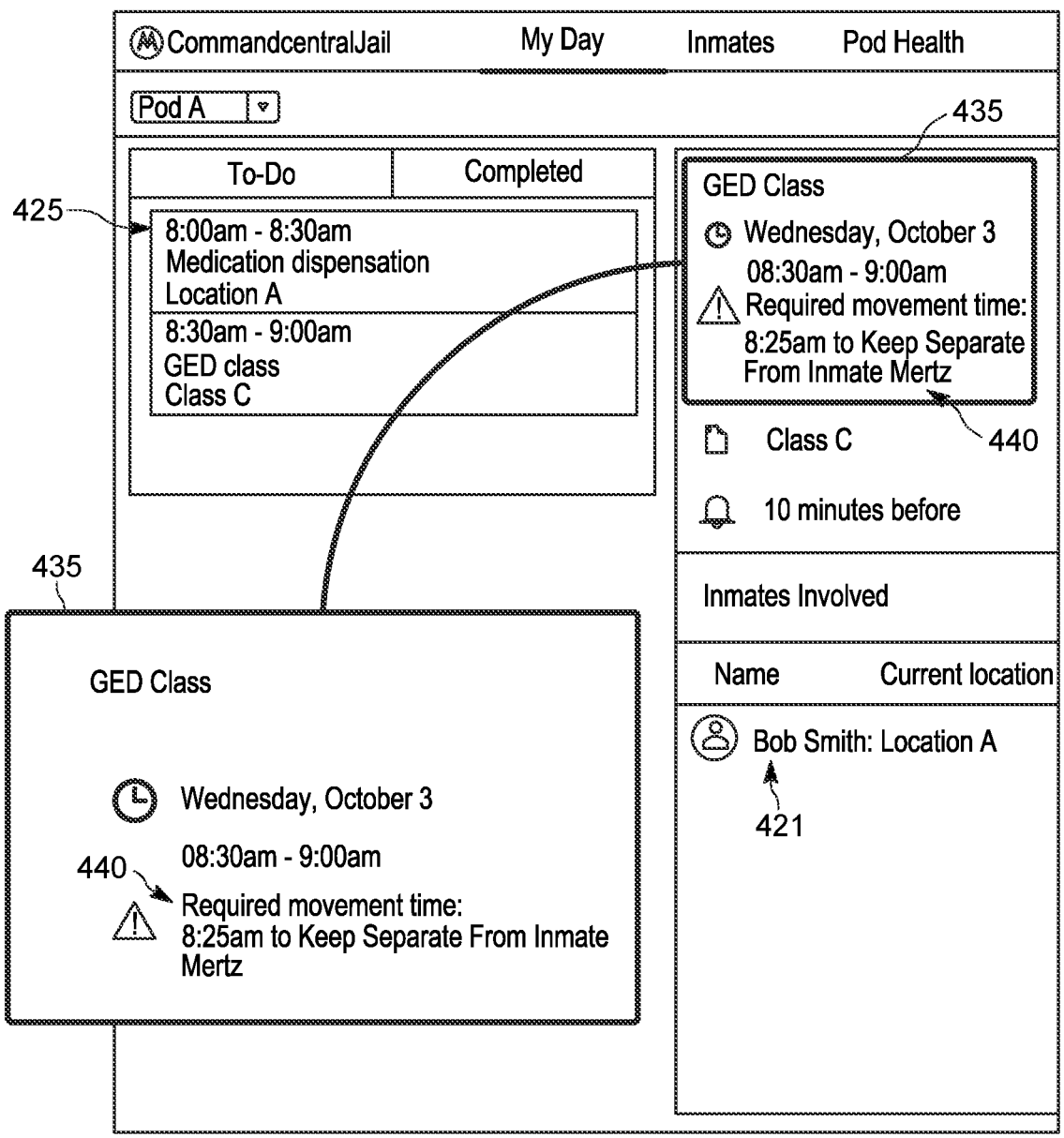
FIG. 4 depicts modified schedule data to temporally separate inmates, in accordance with some examples.
Figure 5:
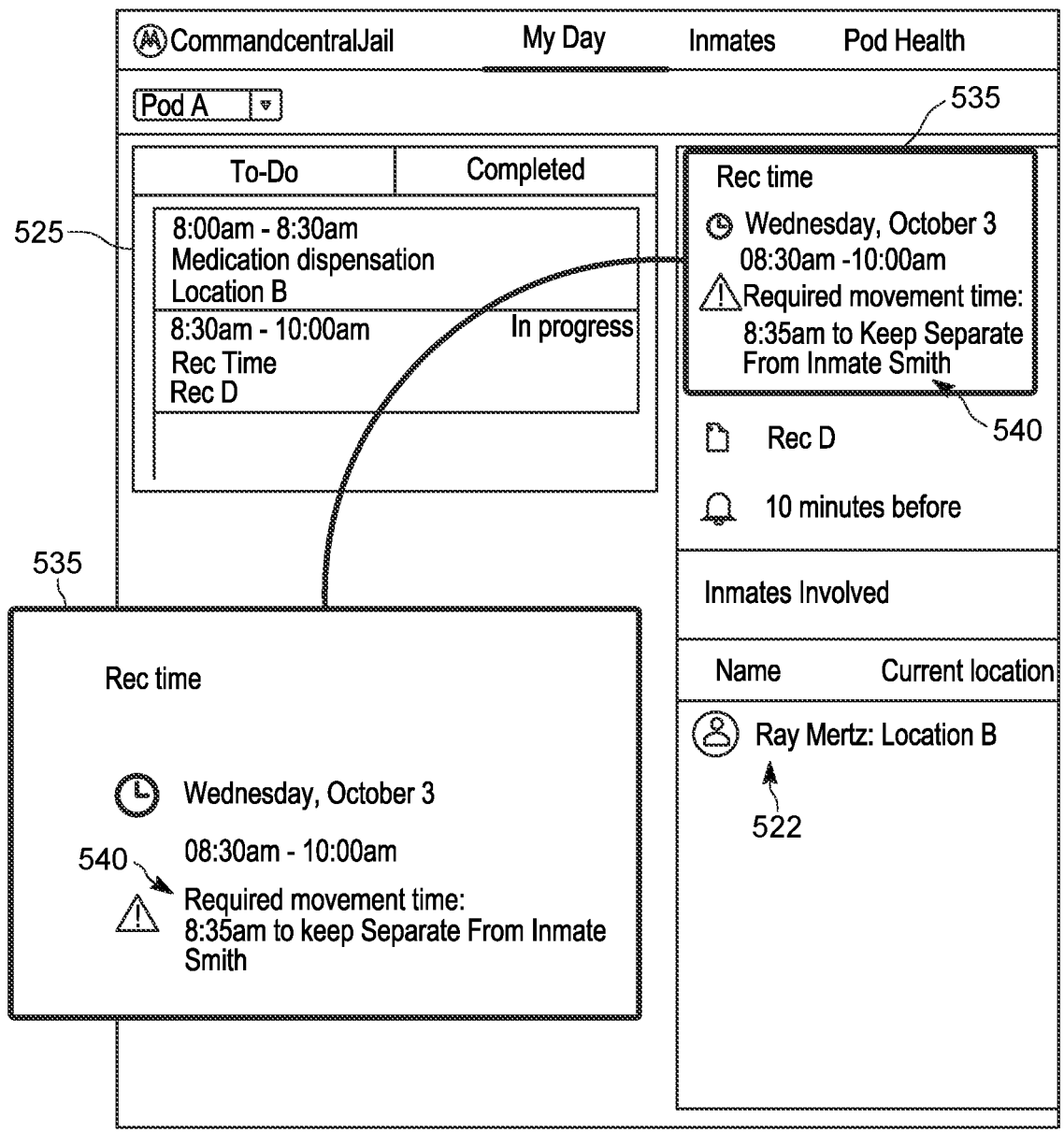
FIG. 5 depicts modified schedule data to yet further temporally separate inmates, in accordance with some examples.

Attention is next directed to FIG. 4 and FIG. 5, which depicts a specific example of the device 101 implementing the method 300 to temporally modify respective schedule data 117-1, 117-2 (interchangeably referred to as the schedule data 117), for example according to a temporal keep-separate attribute 113 and/or an associated temporal keep-separate rule 115 defining that inmates are to temporally separated by 10 minutes. While specific components of the device 101 are not depicted in FIG. 4 and FIG. 5, such components, such as the controller 220, are understood to be present. For example, it is understood that the schedule data 117 is being modified by the device 101. Furthermore, while the schedule data 117 depicted in FIG. 4 and FIG. 5 is in a calendar format, the schedule data 117 may be in any suitable format. Furthermore, the schedule data 117 depicted in FIG. 4 and FIG. 5 may have been provided to, respectively, the communication devices 131, 132 for rendering at a display screen thereof.

With reference to FIG. 4, it is understood that the schedule data 117-1 is associated with an inmate 421 "Bob Smith", who may be associated with the inmate profile 111, and includes a list 425 of times and locations of activities of the inmate 421. In particular, the inmate 421 is to receive medication at a "Location A" between 8:00 am and 8:30 am, and is to attend a GED (Graduate Equivalency Degree) class at a "Class C" between 8:30 am and 9:00 am. Presuming that the inmate 421 is currently in Location A (e.g., the current time is between 8:00 am and 8:30 am), the inmate 421 is to be transported to Class C (e.g., by the officer 121 that received the schedule data 117-1) to attend the GED class at 8:30 am. Details 435 of the GED class are depicted in a corner of the schedule data 117-1; the details 435 are also depicted in a larger format (e.g., blow-up portion) on an opposite side of the schedule data 117-1 to show details thereof, but such blow-up portions may not be included in the schedule data 117-1. It is understood in FIG. 4 that the method 300 has been implemented and that the schedule data 117 (e.g., the schedule data 117-1) has been modified (e.g., at the block 308) in accordance with the temporal keep-separate attribute 113 and/or the associated temporal keep-separate rule 115 identified as being associated with the inmate profiles 111, 112, as indicated by the notification 440.

For example, attention is next directed to FIG. 5, which depicts the schedule data 117-2 of an inmate 522 "Ray Mertz", who may be associated with the inmate profile 112. The schedule data 117-2 further includes a list 525 of times and locations of activities of the inmate 522. In particular, the inmate 522 is to receive medication at a "Location B" between 8:00 am and 8:30 am, and is to have recreational ("Rec") time at a "Rec C" gym between 8:30 am and 10:00 am. Presuming that the inmate 522 is currently in Location B (e.g., the current time is between 8:00 am and 8:30 am), the inmate 522 is to be transported to Rec D (e.g., (e.g., by the officer 122 that received the schedule data 117-2) to have the recreational time at 8:30 am. Details 535 of the Rec time are depicted in a corner of the schedule data 117-2; the details 535 are also depicted in a larger format (e.g., a blow-up portion) on an opposite side of the schedule data 117-2 to show details thereof, but such blow-up portions may not be included in the schedule data 117-1. As in FIG. 4, it is understood in FIG. 5 that the method 300 has been implemented and that the schedule data 117 (e.g., the schedule data 117-2) has been modified (e.g., at the block 308) in accordance with the temporal keep-separate attribute 113 and/or the associated temporal keep-separate rule 115 identified as being associated with the inmate profiles 111, 112, as indicated by the notification 540.

In particular, the controller 220 and/or the device 101 has identified (e.g., at the block 302) that the keep-separate attribute 113 associated with the inmate profiles 111, 112 generally indicates that the inmates 421, 522 are to be kept temporally separate. Furthermore, the controller 220 and/or the device 101 has determined that if the inmates 421, 522 were moved from their respective locations (e.g., the Location A and the Location B) to attend their various activities at 8:30 am, their movements would overlap and/or the inmates would be in same location at a same time, and hence the controller 220 and/or the device 101 has determined that the keep-separate attribute 113 is violated (e.g., a "YES" decision at the block 304).

As such, the controller 220 and/or the device 101 has implemented a corrective action (e.g., at the block 306) by modifying (e.g., at the block 308) the schedule data 117, and/or by transmitting the notifications 440, 540 to the communication devices 131, 132 for rendering at respective display screens thereof Hence, for example, the notification 440 indicates that a movement time of the inmate 421 has changed from a previous time (not depicted) and/or a time to be determined by the officer 121, to "8:25 am" to keep the inmate 421 separate from the inmate 522. Similarly, the notification 540 indicates that a movement time of the inmate 522 has changed from a previous time (not depicted) and/or a time to be determined by the officer 122, to "8:35 am" to keep the inmate 522 separate from the inmate 421. Hence, movement of the inmates will be temporally separated by 10 minutes, as defined by the keep-separate attribute 113 and/or the associated temporal keep-separate rule 115. In some examples a buffer may be added to the time. Furthermore, which inmate is to be moved first, and/or at which times, may be determined programmatically and/or using a machine-learning algorithm, and the like.

Figure 6:
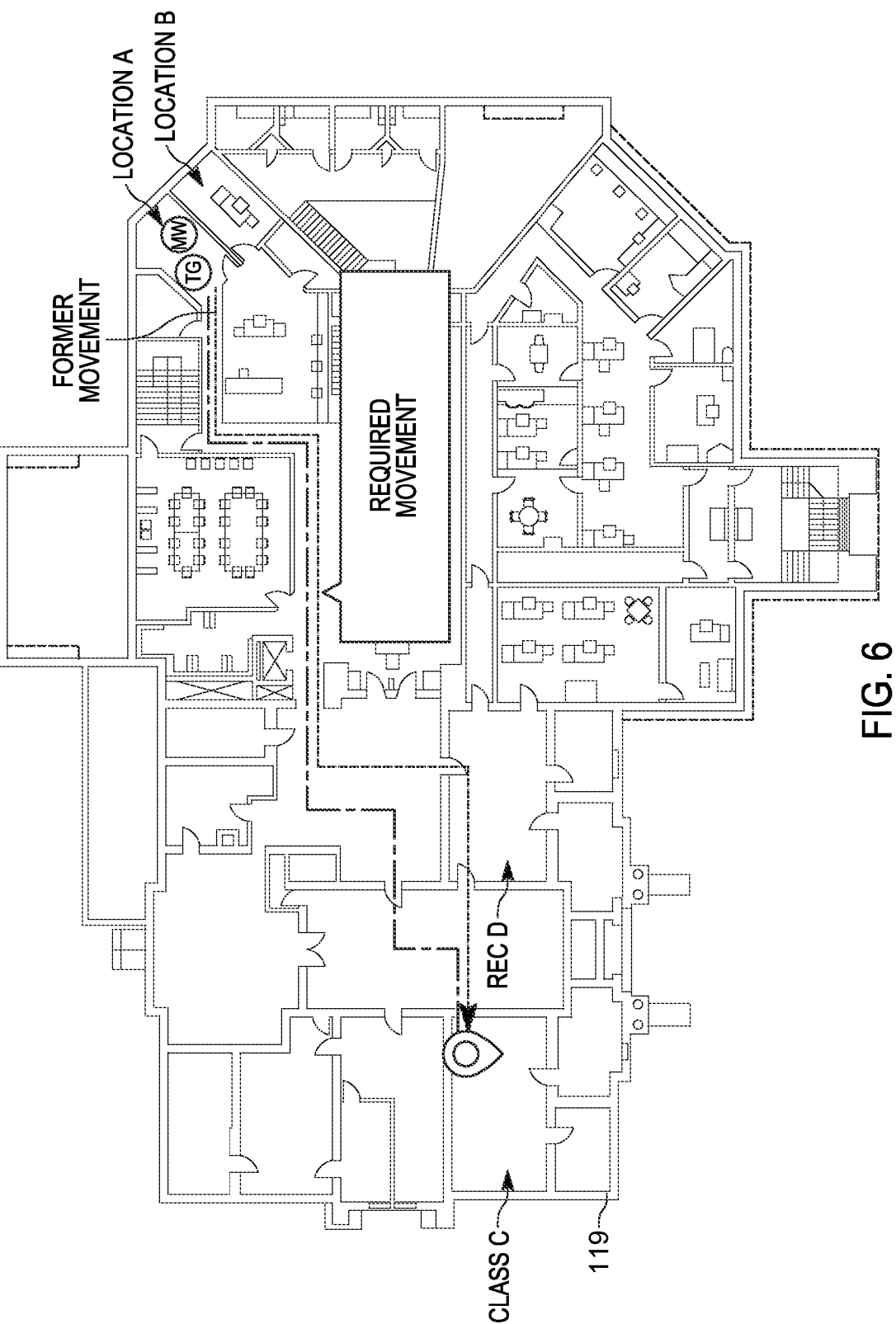
FIG. 6 depicts modified schedule data to spatially separate inmates, in accordance with some examples.
Figure 7:
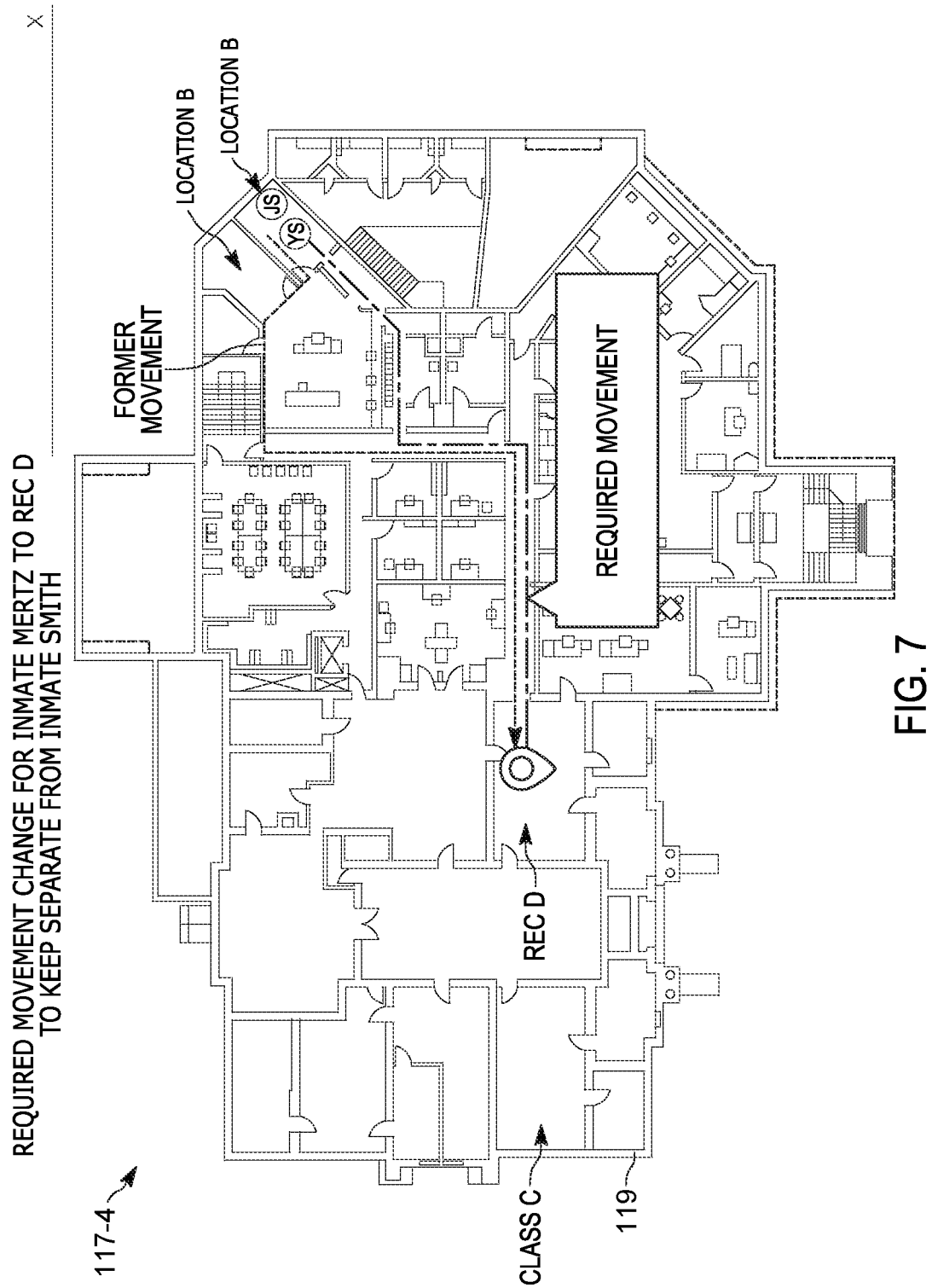
FIG. 7 depicts further modified schedule data to yet further spatially separate inmates, in accordance with some examples.

Attention is next directed to FIG. 6 and FIG. 7, which depicts another specific example of the device 101 implementing the method 300 to spatially modify respective schedule data 117-1, 117-2 (interchangeably referred to as the schedule data 117), for example according to a spatial keep-separate attribute 113 and/or an associated keep-separate rule 115 defining a given distance by which inmates are to be kept separated. While specific components of the device 101 are not depicted in FIG. 6 and FIG. 7, such components, such as the controller 220, are understood to be present. For example, it is understood that the schedule data 117 is being modified by the device 101. Furthermore, while the schedule data 117 is depicted in FIG. 6 and FIG. 7 in a map format, for example on the map 119, the schedule data 117 may be in any suitable format. Furthermore, the schedule data 117 depicted in FIG. 6 and FIG. 7 may have been provided to, respectively, the communication devices 131, 132 for rendering at a display screen thereof. Furthermore, the schedule data 117-1, 117-2 may be provided together to the communication device 131, for example, to modify a time and movement for transporting the inmate 421, and the schedule data 117-1, 117-2 may be provided together to the communication devices 132, for example, to modify a time and movement for transporting the inmate 522, for example to keep the inmates 421, 522 temporally and spatially separate.

In particular, each of the schedule data 117-1, 117-2 includes the map 119, and a former and/or previous movement (labelled "Former Movement" in each of FIG. 6 and FIG. 7) by which each of the inmates 421, 522 was to have been transported to their respective locations "Class C" and "Rec D", from their respective starting locations "Location A" and "Location B" as defined, for example, by the schedule data 117 prior to implementation of the method 300. As clearly understood by comparing FIG. 6 and FIG. 7, the former movements overlapped in several areas of the prison and hence the controller 220 and/or the device 101 determines (e.g., at the block 306)) that the spatial keep-separate attribute 113, and/or the associated spatial keep-separate rule 115, is violated. As such, at the block 308, the controller 220 and/or the device 101 modifies the schedule data 117 to change the former movements to the respective required movements depicted in FIG. 6 and FIG. 7 (labelled "Required Movement" in each of FIG. 6 and FIG. 7). In particular, the required movements do not overlap and/or are separated by the given distance defined by the spatial keep-separate attribute 113 and/or the associated keep-separate rule 115. For example, all points of both required movements may be separated by the given distance defined by the spatial keep-separate attribute 113 and/or the associated keep-separate rule 115.

While the information in FIG. 6 and FIG. 7 is particular to respective inmates, in other examples, the information in FIG. 6 and FIG. 7 may be provided in any other suitable manner. For example, the information in FIG. 6 and FIG. 7 may be provided according to movement changes, such that the map 119 is provided with a former movements for both of the associated inmates and the map 119 may again be provided with changed movements for both of the associated inmates.

Furthermore, non-overlapping required movements may be determined programmatically and/or using a machine-learning algorithm, and the like. For example, the former movements may be changed and updated movements may be tested as to whether they overlap or not and/or as to whether the inmates will be separated by the given distance (e.g., optionally with a buffer distance added thereto). Once the updated movements meet the criteria defined by the associated keep-separate rule 115, the updated movements are designated as the required movements.

The schedule data 117-1, 117-2 as depicted in FIG. 6 and FIG. 7, once updated and/or generated, may respectively be transmitted to the communication devices 131, 132 such that the officers 121, 122 respective escort transport the inmates 421, 522 along the required movements, for example starting at the times indicated by the notifications 440, 540. As the inmates 421, 522 are both temporally and spatially separated, the risk to the inmates 421, 522 meeting each other and/or seeing and/or hearing and/or physically interacting with each other is reduced.

While the examples in FIG. 4, FIG. 5, FIG. 6 and FIG. 7 are described with respect to the officers 121, 122 transporting one inmate each, in general the officers 121, 122 escort groups of inmates around the prison, and the groups may be automatically selected according to activities of the inmates, as well associated keep-separate attributes 113 (and/or keep-separate rules 115) such that pairs of inmates having inmate profiles with associated keep-separate attributes 113 (and/or keep-separate rules 115) are not placed in a same group to be escorted by an officer 121, 122. Similarly, keep-separate attributes 113 (and/or keep-separate rules 115) may be used to assign inmates to pods and/or cells and/or to change inmate assignments to pods and/or cells.

Figure 8:
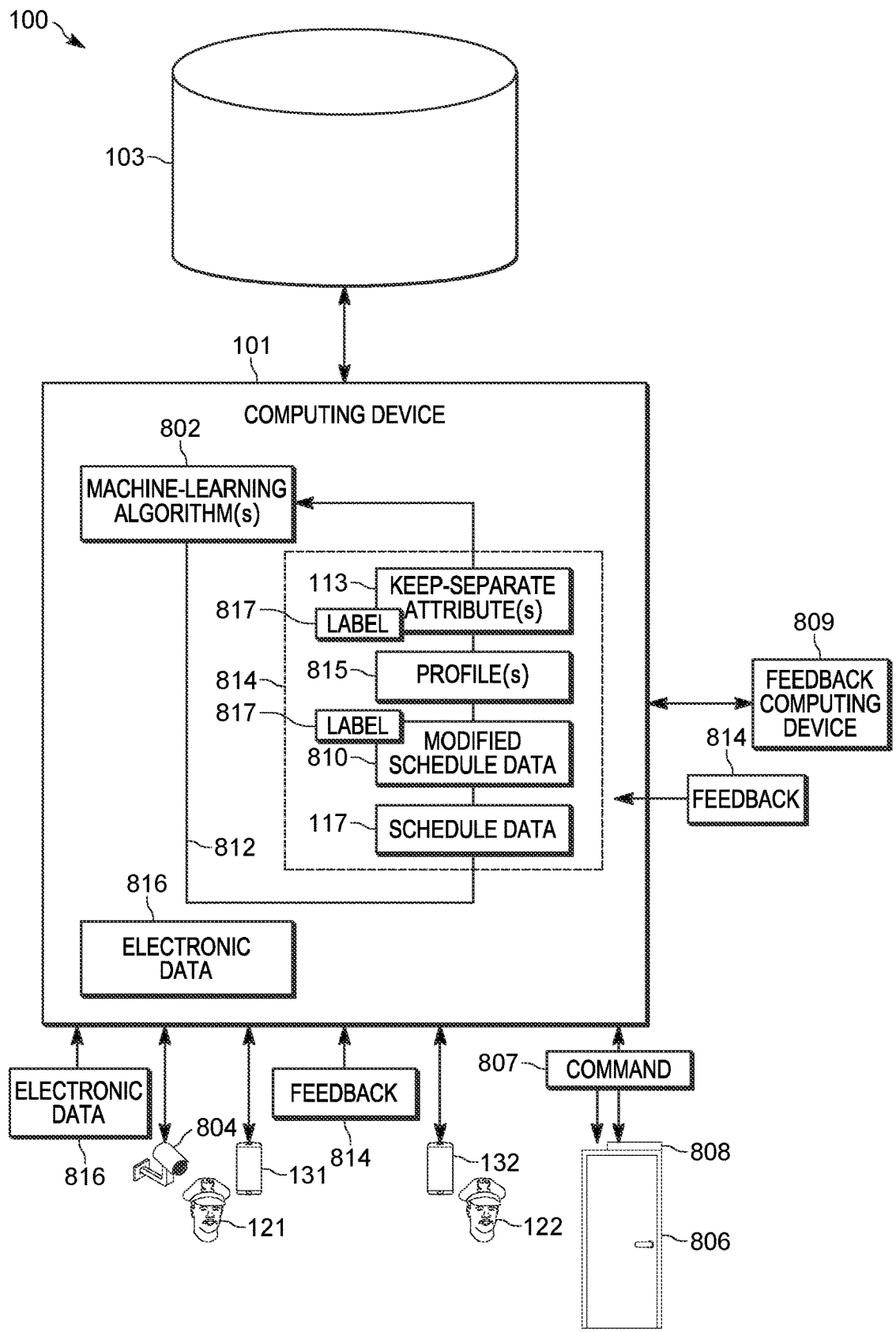
FIG. 8 depicts the system of FIG. 1 showing further components thereof, including machine-learning algorithms, and cameras and access points of a prison, in accordance with some examples.

Attention is next directed to FIG. 8, which depicts the system 100, but showing further components thereof, including one or more machine-learning algorithms 802 being implemented by the computing device 101, and one or more cameras 804 in communication with the computing device 101, and one or more access points 806; as depicted, the one or more access points 806 may be controlled by respective access control mechanisms 808 in communication with the computing device 101. FIG. 8 further depicts an optional feedback computing device 809 in communication with the computing device 101. While for simplicity not all components of the system 100 are depicted (e.g., components of the database 103), such components are nonetheless understood to be present where suitable.

The one or more machine-learning algorithms 802 may be components of the application 223 as described above. As has been previously mentioned, the application 223 may be operated by the controller 220 in a training mode to train the one or more machine-learning algorithms 802 (e.g., which may comprise deep learning and/or neural networks of the application 223 as described above), to determine keep-separate attributes 113 by comparing inmate profiles 111, and/or which have been trained to update inmate profiles 111 based on monitored behavior.

However, the one or more machine-learning algorithms 802 may be additionally and/or alternatively be generally trained (e.g., in a training mode) to generate one or more keep-separate attribute 113 and/or modify the schedule data 117, as described above. As depicted, in FIG. 8, the one or more machine-learning algorithms 802 may modify the schedule data 117 to generate modified schedule data 810 (e.g., which may comprise the schedule data 117 as modified, as described herein).

However, as depicted, it is understood that the one or more machine-learning algorithms 802 may be further operated in a machine-learning feedback loop 812 for further training the one or more machine-learning algorithms 802. The machine-learning feedback loop 812 generally comprises processing feedback 814 indicative of an evaluation of one or more of keep-separate attribute 113 and modified schedule data 810.

For example, as depicted, one or more keep-separate attributes 113 and/or one or more sets of modified schedule data 810 may be provided to the one or more machine-learning algorithms 802 in a machine-learning feedback loop 812 as training data and/or labelled training data. In particular, as depicted, the one or more keep-separate attributes 113 may be provided, in combination with inmate profiles 815 (e.g., the inmate profiles 111, 112 and/or any other suitable inmate profiles) used to generate the one or more keep-separate attributes 113 as a training set of the feedback 814 for training the one or more machine-learning algorithms 802 to better generate keep-separate attributes 113. Similarly, as depicted, the one or more sets of modified schedule data 810 may be provided, in combination with respective schedule data 117 prior to modification, as a training set of the feedback 814 for training the one or more machine-learning algorithms 802 to better generate modified schedule data 810.

In particular, the one or more keep-separate attributes 113 and/or the one or more sets of modified schedule data 810 may be labelled (e.g., with respective labels 817) to indicate whether the one or more keep-separate attributes 113 and/or one or more sets of modified schedule data 810, as generated by the one or more machine-learning algorithms 802, represent positive (e.g., effective) examples or negative (e.g., ineffective) examples.

For example, the one or more machine-learning algorithms 802 may, when generating a keep-separate attribute 113 and/or modified schedule data 810, also generate an associated respective probability score, for example on a scale of 0 to 100, with higher scores indicating a higher level of respective confidence in predicting and/or generating a keep-separate attribute 113 and/or modified schedule data 810; hence, the one or more keep-separate attributes 113 and/or one or more sets of modified schedule data 810 may be labelled with the scores in the feedback 814. Put another way, the labels 817 may comprise respective scores of a keep-separate attribute 113 and a set of modified schedule data 810. In one example, however, such scores may be binary with, for example, a score of "0" indicating a negative example and a score of "1" indicating a positive example. In yet further examples, only positive examples of keep-separate attributes 113 and/or sets of modified schedule data 810 may be provided to the one or machine-learning algorithms 802 in the machine-learning feedback loop 812 (e.g., which may or may not be labeled as a binary score of "1" may be understood to be inherent in such examples). However, any suitable scoring scheme is within the scope of the present specification Regardless, when a keep-separate attribute 113 and/or modified schedule data 810 of the feedback 814 (e.g., along with respective labels 817) are provided to the one or more machine-learning algorithms 802 in the machine-learning feedback loop 812, the one or more machine-learning algorithms 802 may be better trained to generate keep-separate attributes 113 and/or modified schedule data 810 on the basis of the labels and/or the scores.

However, as depicted, at least a portion of the feedback 814 may be generated at the one or more communication devices 131, 132. For example, one or more of the correctional officers 121, 122 may review a keep-separate attribute 113 and/or modified schedule data 810 at a respective communication devices 131, 132, and manually enter an associated score of a keep-separate attribute 113 and/or modified schedule data 810 at a respective communication devices 131, 132, for example to label a keep-separate attribute 113 and/or modified schedule data 810 with the score. Such feedback 814 may be provided to the computing device 101 by a communication device 131, 132 for use by the machine-learning feedback loop 812. However, such scoring using manual input may be implemented at any suitable computing device of the system 100, for example via a computer terminal and/or laptop operated by one or more of the correctional officers 121, 122, a supervisor of the one or more of the correctional officers 121, 122, an administrator of the prison, and the like.

In some of these examples, one or more of the correctional officers 121, 122, and the like, may be tasked with verifying labels and/or scores of a keep-separate attribute 113 and/or modified schedule data 810 via a respective communication device 131, 132, and the like, when scores are below a threshold score such, as 50%, 60% and/or any other suitable threshold score.

In other examples, the keep-separate attributes 113 and the modified schedule data 810 generated by the one or more machine-learning algorithms 802 may be provided to the feedback computing device 809, which may be a component of the system 100 and/or external to the system 100 that has been specifically trained to generate labels and/or scores for keep-separate attributes 113 and modified schedule data 810, and/or verify labels and/or scores of the keep-separate attributes 113 and the modified schedule data 810. The feedback computing device 809 may generate and/or verify labels and/or scores and provide the generated and/or verified labels and/or scores as feedback 814 (and/or at least a portion of the feedback 814, such as the labels 817) back to the computing device 101 for storage (e.g., at the database 103) until the machine-learning feedback loop 812 is implemented.

Put another way, labels and/or scores of the feedback 814 may be generated and/or provided in any suitable manner and/or by any suitable computing device and/or communication device.

Furthermore, the feedback 814 is generally indicative of an evaluation of one or more of a keep-separate attribute 113 and schedule data 117 as modified (e.g., the modified schedule data 810). For example, the depicted labels 817 may represent such an evaluation via respective scores.

Furthermore, while not depicted, the one or more machine-learning algorithms 802 may be further configured to update inmate profiles 815 (e.g., the inmate profiles 111, 112) and the feedback 814 may be adapted accordingly.

Regardless, by implementing the machine-learning feedback loop 812, more efficient operation of the computing device 101 may be achieved as the one or more machine-learning algorithms 802 are trained to better and/or more efficiently generate keep-separate attributes 113 and/or modified schedule data 810.

Put another way, a first training set may be generated from initial keep-separate attributes and/or initial modified schedule data collected and/or generated, in any suitable manner, for example via the feedback computing device 809, and/or that has been generated in any suitable manner; such initial keep-separate attributes and/or initial modified schedule data may be indicative of positive examples of keep-separate attributes and/or modified schedule data. The first training set may be used to train the one or more machine-learning algorithms 802, in a first stage of the machine-learning feedback loop 812, to generate keep-separate attributes and/or modified schedule data. Similarly, a second training set may be generated from initial keep-separate attributes and/or initial modified schedule data collected and/or generated, in any suitable manner that are indicative of negative examples of keep-separate attributes and/or modified schedule data. The second training set may be used to further train the one or more machine-learning algorithms 802, in a second stage of machine-learning feedback loop 812. Similarly, after the one or more machine-learning algorithms 802 are trained using the first training set of positive examples and the second training set of negative examples, in a second stage of the machine-learning feedback loop 812, the one or more machine-learning algorithms 802 may be further trained using a fourth training set of positive examples of keep-separate attributes 113 and/or modified schedule data 810 and/or a fifth training set of negative examples of keep-separate attributes 113 and/or modified schedule data 810; the machine-learning feedback loop 812 as depicted in FIG. 8 may hence show the second stage thereof, and the feedback 914 may comprise such a fourth training set and fifth training set of the second stage. Furthermore, the first training set and the second training set may be used in any suitable order to train the one or more machine-learning algorithms 802 in the first stage, and similarly the third training set and the fourth training set may be used in any suitable order to train the one or more machine-learning algorithms 802 in the second stage. Indeed, components of the first training set and the second training set, and/or components of the third training set and the fourth training set, may be used to train the one or more machine-learning algorithms 802 in any suitable order.

As depicted in FIG. 8, the system 100 further comprises the one or more cameras 804. The one or more cameras 804 may be located at respective locations throughout the prison, for example as represented by the map 119. The one or more cameras 804 may include respective microphones, and the like and, in general, the one or more cameras 804 may generate video data and/or audio data that monitor inmates associated with respective inmate profiles 815. However, microphones independent of cameras may also be present in the system 100.

For example, as has been previously described, electronic monitoring of inmates and/or behavior of inmates may be monitored via video cameras and/or microphones, which may be represented by the one or more cameras 804. Alternatively, and/or in addition, electronic monitoring of inmates and/or behavior of inmates may be monitored based on electronic reports indicating inmate behavior, for example as electronically submitted to the computing device 101 by one or more correctional officers, and the like, at the prison (including, but not limited to, the correctional officers 121, 122 operating the communication devices 131, 132). Hence, video data and/or audio data generated by the one or more cameras 804 may be components of electronic data 816 used to electronically monitoring of inmates and/or behavior of inmates; such electronic data 816 may include electronic reports submitted to the computing device 101 by one or more correctional officers.

However, the one or more cameras 804 may alternatively be used to monitor locations of the correctional officers 121, 122, for example as the correctional officers 121, 122 are escorting inmates. For example, video data from the one or more cameras 804 may be analyzed (e.g., by one or more video analysis engines at the computing device 101 and/or at the one or more cameras 804) to identify one or more of the correctional officers 121, 122 in video data, as well as a respective location.

Alternatively, and/or in addition, the communication devices 131, 132 carried by the correctional officers 121, 122, may determine, and report to the computing device 101, respective locations of the correctional officers 121, 122 using respective, location determining devices (e.g., GPS devices).

Regardless, the computing device 101 may be generally configured to determine respective locations of the correctional officers 121, 122.

The computing device 101, generally having access to required movements (e.g., routes) of the correctional officers 121, 122 as indicated by the schedule data 117 as modified (e.g., the modified schedule data 810) may hence monitor respective locations of the correctional officers 121, 122 and control the one or more access points 806 to one or more of unlock and open according to the one or more respective locations and the schedule data 117 as modified (e.g., the modified schedule data 810). For example, the computing device 101 may unlock and/or open an access point 806 when a correctional officer 121, 122, escorting a respective inmate, approaches the access point 806, the controlling of the access point 806 occurring via a respective access control mechanism 808.

As depicted, an access point 806 may include a door, and the like, of the prison, and the like, which may be locked or unlocked via an access control mechanism 808, which may include an electronically controlled lock, and the like. Alternatively, an access control mechanism 808 may comprise an electronically controlled door opening and closing mechanism. Regardless, the computing device 101 may lock, unlock, open and close the access points 806 (e.g., via respective commands 807). An access point 806 may hence generally include any suitable type of access point, which may be locked and unlocked, and/or opened and closed. Indeed, examples of access points 806 of the prison are shown on the map 119 in FIG. 6 and FIG. 7.

As depicted, the computing device 101 may control an access point 806 to unlock and/or open when a correctional officer 121, 122, escorting a respective inmate, approaches the access point 806, by the computing device 101 providing and/or transmitting a command 807 to a respective access control mechanism 808, the command 807 to control the access control mechanism 808 to unlock and/or open the access point 806. In some examples, an access control mechanism 808 may control a respective access point 806 to lock and/or close after a given time period, and/or when a correctional officer 121, 122, escorting a respective inmate, passes through the access point 806 (e.g., as detected via sensors (not depicted), and the like, of an access control mechanism 808). In other examples, the computing device 101 may control a respective access point 806 to lock and/or close after a given time period via another command 807 provided and/or transmitted to a respective access control mechanism 808 (e.g., which controls the respective access control mechanism 808 to lock and/or close the respective access point 806). Similarly, in yet further examples, the computing device 101 may control a respective access point 806 to lock and/or close via a command 807 provided and/or transmitted to a respective access control mechanism 808 (e.g., which controls the respective access control mechanism 808 to lock and/or close the respective access point 806), when a correctional officer 121, 122, escorting a respective inmate, passes through the access point 806; in particular, locations of correctional officers 121, 122 may be detected via sensors of the system 100 including, but not limited to, the cameras 804, as described herein. Hence, while determining locations of correctional officers 121, 122 and/or inmates is described herein with respect to the computing device 101 receiving video data from the cameras 804, determining locations of correctional officers 121, 122 and/or inmates may occur in any suitable manner. For example, motion and/or position sensors at the access control mechanisms 808 may detect a location of a correctional officers 121, 122, and/or a correctional officer 121, 122 may use a key card at an access point 806; in particular, a key card may electronically provide credentials of a correctional officer 121, 122 when presented to a key card reader at an access point 806 (e.g., which may be incorporated into an access control mechanism 808), and the key card reader may provide the credentials to the computing device 101 such that the computing device 101 may determine that a correctional officer 121, 122 is located at the access point 806.

Figure 9:
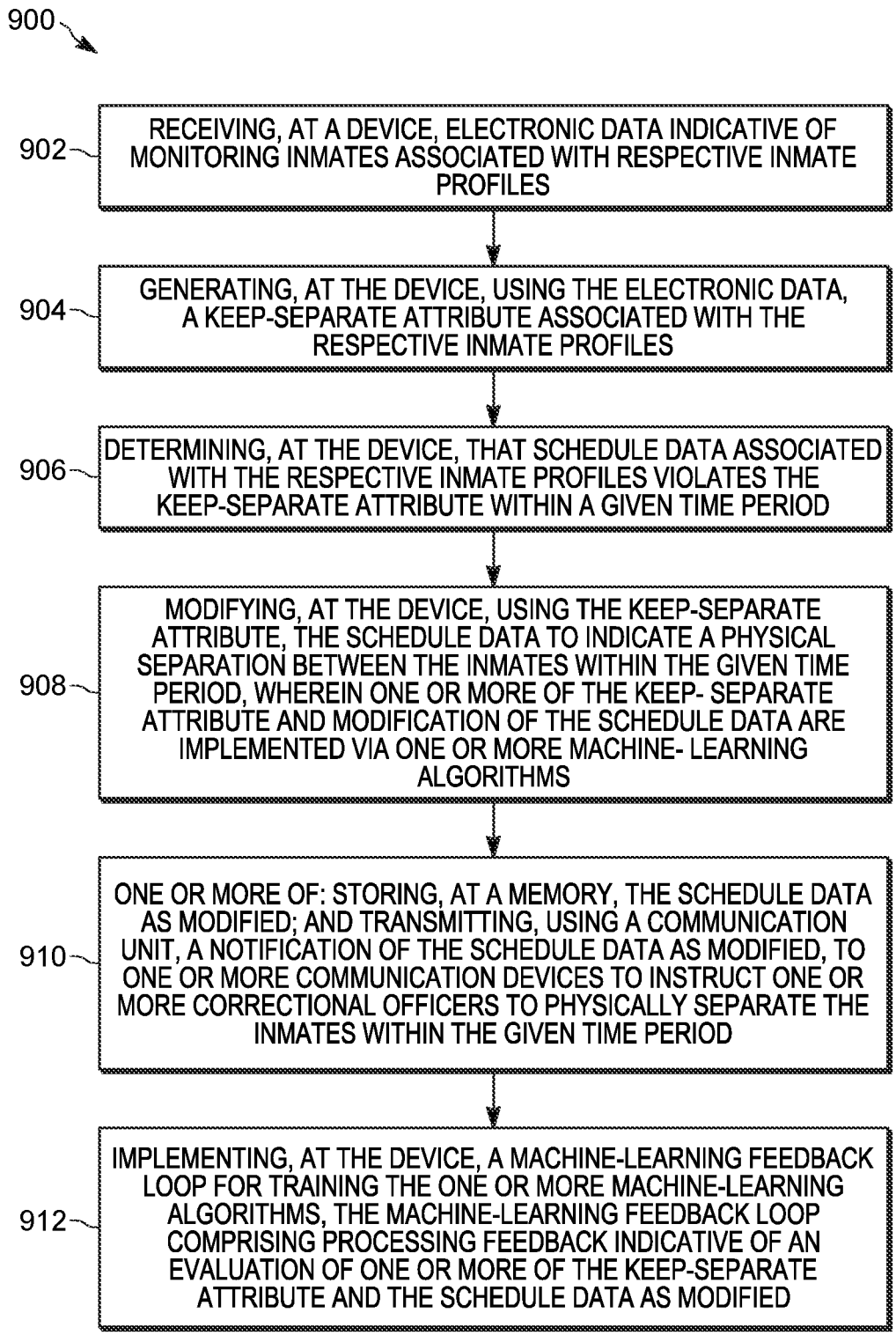
FIG. 9 is a flowchart of a method for electronically implementing corrective actions based on keep-separate attributes and that includes a machine-learning feedback loop, in accordance with some examples.

Attention is now directed to FIG. 9, which depicts a flowchart representative of a method 900 for electronically implementing corrective actions based on keep-separate attributes. The operations of the method 900 of FIG. 9 correspond to machine readable instructions that are executed by the device 101, and specifically the controller 220 of the device 101. In the illustrated example, the instructions represented by the blocks of FIG. 9 are stored at the memory 222 for example, as the application 223. The method 900 of FIG. 9 is one way in which the controller 220 and/or the device 101 and/or the system 100 may be configured. Furthermore, the following discussion of the method 900 of FIG. 9 will lead to a further understanding of the system 100, and its various components.

The method 900 of FIG. 9 need not be performed in the exact sequence as shown and likewise various blocks may be performed in parallel rather than in sequence. Accordingly, the elements of method 900 are referred to herein as "blocks" rather than "steps." The method 900 of FIG. 9 may be implemented on variations of the system 100 of FIG. 1, as well.

At a block 902, the controller 220 and/or the device 101 receives (e.g., via and/or using the communication unit 202) the electronic data 816 indicative of monitoring inmates associated with respective inmate profiles 815. As previously described, the electronic data 816 may comprise one or more of video data, audio data, and an electronic report. Also as previously described, the electronic data 816 may be received from one or more of one or more of a video camera, a microphone and a communication device (e.g., as represented by the one or more of the cameras 804 and/or the one or more communication devices 131, 132).

At a block 904, the controller 220 and/or the device 101 generates, using the electronic data 816, a keep-separate attribute 113 associated with the respective inmate profiles 815. Such generation of a keep-separate attribute 113 has been described elsewhere in the present application, for example with respect to the method 300.

At a block 906, the controller 220 and/or the device 101 determines that schedule data 117 associated with the respective inmate profiles 815 violates the keep-separate attribute 113 within a given time period. Examples of such violations are described elsewhere in the present specification, for example with respect to the method 300.

At a block 908, the controller 220 and/or the device 101 modifies, using the keep-separate attribute 113, the schedule data 117 (e.g., and/or generates modified schedule data 810) to indicate a physical separation between the inmates within the given time period. As has been previously described, one or more of the keep-separate attribute 113 and modification of the schedule data 117 may implemented via the one or more machine-learning algorithms 802. Otherwise modification of the schedule data 117 are described elsewhere in the present specification, for example with respect to the method 300.

As described herein, the method 900 may further comprise the controller 220 and/or the device 101 identifying one or more keep-separate rules 115 associated with the keep-separate attribute 113, and modifying the schedule data 117 in accordance with the keep-separate attribute 113 may comprise the controller 220 and/or the device 101 modifying the schedule data 117 according to the one or more keep-separate rules 115.

Furthermore, as described herein, the method 900 may further comprise the controller 220 and/or the device 101: identifying a plurality of keep-separate attributes 113 associated with the respective inmate profiles 815 as being violated by the schedule data 117, the plurality of keep-separate attributes 113 including the keep-separate attribute 113 (e.g., of the block 904), each of the plurality of keep-separate attributes 113 associated with respective keep-separate rules 115; and identifying one or more most-stringent keep-separate rules 115 of the respective keep-separate rules 115, and modifying the schedule data 117 in accordance with the keep-separate attribute 113 may comprise the controller 220 and/or the device 101 modifying the schedule data 117 according to the one or more most-stringent keep-separate rules 115. Such modifying the schedule data 117 according to the one or more most-stringent keep-separate rules 115 is described elsewhere in the present specification, for example with respect to the method 300.

Furthermore, in some examples, the controller 220 and/or the device 101 modifying the schedule data 117 in accordance with the keep-separate attribute 113 (e.g., of the block 904) may comprise one or more of modifying: one or more respective movements (e.g., routes) of the schedule data 117; one or more respective activity times of the schedule data 117; one or more routes of the schedule data 117; applying one or more spatio-temporal constraints to the schedule data 117; applying one or more spatio-temporal buffers to the schedule data 117. Examples of such modifying are provided throughout the present specification, for example with respect to the method 300. In a particular, an initial movement and/or an initial route may be modified to a required movement and/or a required route as described with respect to FIG. 6 and FIG. 7.

Hence, the schedule data 117, as modified may include one or more of spatio-temporal constraints, respective routes respective times (e.g., the required movements of FIG. 6 and FIG. 7) for the one or more correctional officers 121, 122 to escort the inmates during the given time period to physically separate the inmates during the given time period.

At a block 910, the controller 220 and/or the device 101 one or more of: stores, at a memory (e.g., the database 103), the schedule data 117 as modified; and transmits, using the communication unit 202, a notification of the schedule data 117 as modified, to one or more communication devices 131, 132 to instruct the one or more correctional officers 121, 122 to physically separate the inmates within the given time period. Such storing and/or transmitting of a notification are described elsewhere in the present specification, for example with respect to the method 300. However, it is understood that, in some examples, the notification may include times and movements (e.g., required movements) that a correctional officer 121, 122 is to escort a respective inmate (e.g., inmates 421, 522) along a respective route. In some examples, the times and movements may include respective given times that a correctional officer 121, 122 is to escort a respective inmate through a given access point 806 to ensure physical separation between the respective inmates along the respective routes.

At a block 912, the controller 220 and/or the device 101 implements the machine-learning feedback loop 812, as described herein, for training the one or more machine-learning algorithms 802, the machine-learning feedback loop 812 comprising processing feedback 814 indicative of an evaluation of one or more of the keep-separate attribute 113 and the schedule data 117 as modified.

As previously described, the method 300 may further comprise the controller 220 and/or the device 101 receiving at least a portion of the feedback 814 (e.g., the labels 817) from one or more of the communication devices 131, 132 and/or the feedback computing device 809.

As previously described, the method 300 may further comprise the controller 220 and/or the device 101 controlling one or more access points 806 to one or more of unlock and open according to the schedule data 117 as modified. For example, such control may occur via providing respective commands 807 to one or more access control mechanism 808, as described herein. In some of these examples, the method 300 may further comprise the controller 220 and/or the device 101 electronically monitoring one or more respective locations of the one or more correctional officers 121, 122 tasked with escorting the inmates according to the schedule data 117 as modified; and controlling the one or more access points 806 to one or more of unlock and open according to the one or more respective locations and the schedule data 117 as modified.

In yet further examples, the method 300 may further comprise the controller 220 and/or the device 101 controlling a given access point 806 to one or more of unlock and open (e.g., via a command 807) when a correctional officer 121, 122 approaches the given access point 806 at a given time indicated by the schedule data 117 as modified; otherwise the given access point 806 may remain locked and/or closed until the given time indicated by the schedule data 117. Put another way, the schedule data 117 as modified may indicate that a correctional officer 121, 122 escorting an inmate is to pass through a given access point 806 at a given time, and the controller 220 and/or the device 101 may unlock and/or open the given access point when the correctional officer 121, 122 approaches the given access point 806 at the given time; otherwise the given access point 806 may remain locked and/or closed until the given time indicated by the schedule data 117. Alternatively, and/or in addition, the correctional officer 121, 122 may unlock and/or open the given access point 806 using a key card, and the like.

As also described herein, the method 300 may further comprise the controller 220 and/or the device 101 controlling a given access point 806 to one or more of lock and close (e.g., via a command 807) after a given time period and/or after a correctional officer 121, 122, escorting an inmate, passes through the given access point 806, for example as detected via sensors, such as the cameras 804.

In some examples, the method 300 may further comprise the controller 220 and/or the device 101: determining the respective locations of the correctional officers 121, 122 as they escort respective inmates; and transmitting alerts (e.g., periodically) to respective communication devices 131, 132 of the correctional officers 121, 122 that include the respective locations. The respective locations may be provided, "live", using geographic information (GIS)system overlays, and the like, on respective maps 119 of the prison provided at display screens of the communication devices 131, 132. Hence, in these examples, a correctional officer 121, 122 may be alerted as to a location of another correctional officer 121, 122 to provide a further safeguard in physically separating the inmates being escorted. For example, a correctional officer 121, 122 escorting an inmate associated with a keep-separate attribute 113, now aware of a live location of the other correctional officer 121, 122 escorting another inmate associated with the keep-separate attribute 113, may determine whether the inmates are sufficiently physically separated. Such examples may assist the correctional officers 121, 122 in labelling or scoring a keep-separate attribute 113 and/or the modified schedule data 810 in the feedback 814.

Similarly, the respective locations of the correctional officers 121, 122 may be provided to the feedback computing device 809 trained to generate labels (e.g., the labels 817) and/or scores for keep-separate attributes 113 and modified schedule data 810, and/or verify labels and/or scores of the keep-separate attributes 113 and the modified schedule data 810. Such respective locations may be used by the feedback computing device 809 to generate and/or verify the labels 817 and/or scores for the feedback 814. For example, the respective locations of the correctional officers 121, 122 may be compared by the feedback computing device 809 to determine whether inmates being escorted were sufficiently physically separated, for example using threshold distances and/or threshold separation conditions, such as at least one wall physically separating the inmates being escorted at all times and/or at least locked two access points physically separating the inmates being escorted at all times, and the like. On this basis, the feedback computing device 809 may generate and provide the labels 817 in the feedback 814 to the computing device 101 for the machine-learning feedback loop 812.

Hence, provided herein is a device, system and method for electronically implementing corrective actions based on keep-separate attributes. The corrective actions may include modifying schedule data to temporally separate inmates at a prison and/or modifying schedule data to spatially separate inmates at a prison. The corrective actions may alternatively include transmitting notifications to communication devices associated with correctional officers tasked with escorting inmates, to cause the correctional officers to temporally and/or spatially separate inmates at a prison. The keep-separate attributes may be dynamically updated based on electronic monitoring of the inmates.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot implement a machine-learning feedback loop, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method implemented by a device comprising at least one processor configured to execute computer executable instructions to perform the method, the method comprising:
   receiving, by the device, electronic data indicative of monitoring inmates associated with respective inmate profiles;
   generating, by the device, using the electronic data, a keep-separate attribute associated with the respective inmate profiles based on relationships identified from the electronic data, wherein the keep-separate attribute includes at least one spatio-temporal constraint;
   determining, by the device, that schedule data associated with the respective inmate profiles violates the keep-separate attribute within a given time period;
   modifying, by the at least one processor, using the keep-separate attribute, the schedule data to generate modified schedule data that indicates a physical separation between the inmates within the given time period, wherein one or more of the keep-separate attribute and modification of the schedule data are implemented via one or more machine-learning algorithms, and wherein the schedule data and the modified schedule data include a buffer between respective times for unlocking and locking one or more access points;
   one or more of: storing, at a memory, the modified schedule data; and transmitting, using a communication unit, a notification of the modified schedule data, to one or more communication devices to instruct one or more correctional officers to physically separate the inmates within the given time period;
   controlling, by the device, via one or more respective access control mechanisms, one or more access points to unlock and lock according to the modified schedule data;
   training, by the at least one processor, using a machine-learning feedback loop, the one or more machine-learning algorithms based on feedback labelled as positive examples or negative examples of one or more of the keep-separate attribute and the modified schedule data; and
   generating, by the at least one processor, using the one or more machine-learning algorithms, as trained, further modified schedule data by adjusting one or more spatio-temporal buffers, associated with the at least one spatio-temporal constraint, that adjusts a respective time for unlocking and locking the one or more access points, relative to prior schedule data; and controlling, by the device, via the one or more respective access control mechanisms, the one or more access points to unlock and lock according to the further modified schedule data.

2. The method of claim 1, further comprising:
receiving the feedback from one or more of the communication devices, a computer terminal and a feedback computing device.

3. The method of claim 1, wherein the modified schedule data further includes one or more respective routes and respective times for the one or more correctional officers to escort the inmates during the given time period to physically separate the inmates during the given time period.

4. The method of claim 1, further comprising:
electronically monitoring one or more respective locations of the one or more correctional officers tasked with escorting the inmates according to the modified schedule data; and
controlling the one or more access points to one or more of unlock and open according to the one or more respective locations.

5. The method of claim 1, further comprising:
identifying one or more keep-separate rules associated with the keep-separate attribute, wherein modifying the schedule data in accordance with the keep-separate attribute comprises modifying the schedule data according to the one or more keep-separate rules.

6. The method of claim 1, further comprising:
identifying a plurality of keep-separate attributes associated with the respective inmate profiles as being violated by the schedule data, the plurality of keep-separate attributes including the keep-separate attribute, each of the plurality of keep-separate attributes associated with respective keep-separate rules; and
identifying one or more most-stringent keep-separate rules of the respective keep-separate rules, wherein modifying the schedule data in accordance with the keep-separate attribute comprises modifying the schedule data according to the one or more most-stringent keep-separate rules.

7. The method of claim 1, wherein modifying the schedule data in accordance with the keep-separate attribute comprises one or more of modifying:
one or more respective movements of the schedule data;
one or more respective activity times of the schedule data; and
one or more routes of the schedule data.

8. The method of claim 1, wherein the electronic data comprises one or more of video data, audio data, and an electronic report.

9. The method of claim 1, wherein the electronic data is received from one or more of one or more of a video camera, a microphone and a communication device.

10. A device comprising:
a communication unit; and
at least one processor; and
a memory storing computer executable instructions that, when executed by the at least one processor, controls the at least one processor to:
receive, using the communication unit, electronic data indicative of monitoring inmates associated with respective inmate profiles;

generate, using the electronic data, a keep-separate attribute associated with the respective inmate profiles based on relationships identified from the electronic data, wherein the keep-separate attribute includes at least one spatio-temporal constraint;

determine that schedule data associated with the respective inmate profiles violates the keep-separate attribute within a given time period;

modify, using the keep-separate attribute, using the keep-separate attribute, the schedule data to generate modified schedule data that indicates a physical separation between the inmates within the given time period, wherein one or more of the keep-separate attribute and modification of the schedule data are implemented via one or more machine-learning algorithms, and wherein the schedule data and the modified schedule data include a buffer between respective times for unlocking and locking one or more access points;

one or more of: storing, at a memory, the modified schedule data; and transmitting, using the communication unit, a notification of the modified schedule data, to one or more communication devices to instruct one or more correctional officers to physically separate the inmates within the given time period;

control, via one or more respective access control mechanisms, the one or more access points to unlock and lock according to the modified schedule data;

train, using a machine-learning feedback loop, the one or more machine-learning algorithms based on feedback labelled as positive examples or negative examples of one or more of the keep-separate attribute and the modified schedule data; and generate, using the one or more machine-learning algorithms, as trained, further modified schedule data by adjusting one or more spatio-temporal buffers, associated with the at least one spatio-temporal constraint, that adjusts a respective time for unlocking and locking the one or more access points, relative to prior schedule data; and control, via the one or more respective access control mechanisms, the one or more access points to unlock and lock according to the further modified schedule data.

11. The device of claim 10, wherein the computer executable instructions, when executed by the at least one processor, further controls the at least one processor to:
receive the feedback from one or more of the communication devices, a computer terminal and a feedback computing device.

12. The device of claim 10, wherein the modified schedule further includes one or more of respective routes and respective times for the one or more correctional officers to escort the inmates during the given time period to physically separate the inmates during the given time period.

13. The device of claim 10, wherein the computer executable instructions, when executed by the at least one processor, further controls the at least one processor to:
electronically monitor one or more respective locations of the one or more correctional officers tasked with escorting the inmates according to the modified schedule data; and
control one or more access points to one or more of unlock and open according to the one or more respective locations.

14. The device of claim 10, wherein the computer executable instructions, when executed by the at least one processor, further controls the at least one processor to:

identify one or more keep-separate rules associated with the keep-separate attribute; and modify the schedule data in accordance with the keep-separate attribute by modifying the schedule data according to the one or more keep-separate rules.

15. The device of claim 10, wherein the computer executable instructions, when executed by the at least one processor, further controls the at least one processor to:
   identify a plurality of keep-separate attributes associated with the respective inmate profiles as being violated by the schedule data, the plurality of keep-separate attributes including the keep-separate attribute, each of the plurality of keep-separate attributes associated with respective keep-separate rules;
   identify one or more most-stringent keep-separate rules of the respective keep-separate rules; and
   modify the schedule data in accordance with the keep-separate attribute by modifying the schedule data according to the one or more most-stringent keep-separate rules.

16. The device of claim 10, wherein the computer executable instructions that, when executed by the at least one processor, further controls the at least one processor to modify the schedule data in accordance with the keep-separate attribute by one or more of modifying:
   one or more respective movements of the schedule data;
   one or more respective activity times of the schedule data; and
   one or more routes of the schedule data.

17. The device of claim 10, wherein the electronic data comprises one or more of video data, audio data, and an electronic report.

18. The device of claim 10, wherein the electronic data is received from one or more of one or more of a video camera, a microphone and a communication device.

* * * * *